US011268399B2

(12) United States Patent
Shmilovich et al.

(10) Patent No.: US 11,268,399 B2
(45) Date of Patent: *Mar. 8, 2022

(54) METHODS AND APPARATUS FOR REDUCING FLOW DISTORTION AT ENGINE FANS OF NACELLES

(71) Applicant: The Boeing Company, Chicago, IL (US)

(72) Inventors: Arvin Shmilovich, Huntington Beach, CA (US); Yoram Yadlin, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/793,716

(22) Filed: Feb. 18, 2020

(65) Prior Publication Data
US 2020/0182080 A1 Jun. 11, 2020

Related U.S. Application Data

(63) Continuation of application No. 15/625,664, filed on Jun. 16, 2017, now Pat. No. 10,605,113.

(51) Int. Cl.
*F01D 17/10* (2006.01)
*F01D 25/24* (2006.01)
(Continued)

(52) U.S. Cl.
CPC ............. *F01D 17/10* (2013.01); *F01D 25/24* (2013.01); *F02C 7/04* (2013.01); *F02C 7/057* (2013.01);
(Continued)

(58) Field of Classification Search
CPC ...... F01D 17/10; F01D 17/141; F01D 17/143; F01D 17/145; F01D 17/148; F01D 25/24;
(Continued)

(56) References Cited

U.S. PATENT DOCUMENTS 4,749,151 A * 6/1988 Ball ..................... B64D 33/02
244/53 B
5,340,271 A * 8/1994 Freeman ............ F04D 27/0215
415/1
(Continued)

FOREIGN PATENT DOCUMENTS

JP 5446749 B2 * 3/2014
JP 5446783 B2 * 3/2014

OTHER PUBLICATIONS

Young et al., "An Investigation of Active Flowfield Control for Inlet Shock/Boundary Layer Interaction," 41st AIAA/ASME/SAE/ASEE Joint Propulsion Conference & Exhibit, Jul. 10-13, 2005, 11 pages.
(Continued)

*Primary Examiner* — Brian P Wolcott
(74) *Attorney, Agent, or Firm* — Hanley, Flight & Zimmerman, LLC

(57) ABSTRACT

Methods and apparatus for reducing flow distortion at engine fans of nacelles are disclosed. An example apparatus for reducing flow distortion at an engine fan of a nacelle includes a plurality of nozzles radially spaced about an inner wall of the nacelle. In some examples, respective ones of the nozzles are positioned to eject corresponding respective jets of fluid adjacent the inner wall in a downstream direction toward the engine fan. The example apparatus further includes a controller to selectively activate the respective ones of the nozzles according to a time-based sequence. In some examples, the time-based sequence corresponds to a directional sequence that moves in an arcuate direction along a circumference of the inner wall.

20 Claims, 20 Drawing Sheets

(51) Int. Cl.
*F02C 7/057* (2006.01)
*F02C 7/04* (2006.01)
(52) U.S. Cl.
CPC .... *F05D 2260/16* (2013.01); *F05D 2270/102* (2013.01); *F05D 2270/1022* (2013.01); *F05D 2270/17* (2013.01); *F05D 2270/20* (2013.01)
(58) Field of Classification Search
CPC ........ F02C 7/057; F02C 7/04; F05D 2260/16; F05D 2270/17; F05D 2270/1022; F05D 2270/102; F05D 2270/20
See application file for complete search history.

(56) References Cited

U.S. PATENT DOCUMENTS

| | | | | |
|---|---|---|---|---|
| 6,179,251 | B1 * | 1/2001 | Tindell | B64D 33/02 244/207 |
| 7,617,670 | B2 * | 11/2009 | Truax | F02C 7/04 137/15.1 |
| 7,708,230 | B2 * | 5/2010 | Cloft | F02C 6/08 244/207 |
| 7,784,732 | B2 * | 8/2010 | Owens | F15D 1/001 244/53 B |
| 7,870,720 | B2 * | 1/2011 | Hagseth | F02C 7/04 60/204 |
| 8,192,147 | B2 * | 6/2012 | Haas | B64D 33/02 415/144 |
| 8,209,953 | B2 * | 7/2012 | Winter | B64D 33/02 60/226.1 |
| 8,529,188 | B2 | 9/2013 | Winter | |
| 8,640,986 | B2 * | 2/2014 | Surply | B64D 33/02 244/53 B |
| 9,157,368 | B2 * | 10/2015 | Hurwitz | F01D 17/02 |
| 2018/0363491 | A1 | 12/2018 | Shmilovich et al. | |

OTHER PUBLICATIONS

Kirk et al., "Numerical and Experimental Investigation of a Serpentine Inlet Duct," 45th AIAA Aerospace Sciences Meeting and Exhibit, Jan. 8-11, 2007, 14 pages.

Chima et al., "CFD Models of a Serpentine Inlet, Fan and Nozzle," 48th AIAA Aerospace Sciences Meeting, Jan. 4-7, 2010, 13 pages.

Sheng et al., "Numerical Investigations of Ducted Fan Hover Performance for Fan-In-Wing Applications," 53rd AIAA Aerospace Sciences Meeting, Jan. 5-9, 2015, 16 pages.

Domel, Neal D., "Perspectives on Propulsion CFD for Inlet Applications Relevant to the AIAA Propulsion Aerodynamics Workshop," 51st AIAA/SAE/ASEE Joint Propulsion Conference, Jul. 27-29, 2015, 17 pages.

Sheng et al., "Numerical Investigations of Fan-In-Wing Aerodynamic Performance with Active Flow Control," 34th AIAA Applied Aerodynamics Conference, Jun. 13-17, 2016, 16 pages.

United States Patent and Trademark Office, "Requirement for Restriction and/or Election," issued in connection with U.S. Appl. No. 15/625,664, dated Nov. 13, 2019, 6 pages.

United States Patent and Trademark Office, "Notice of Allowance and Fee(s) Due," issued in connection with U.S. Appl. No. 15/625,664, dated Jan. 30, 2020, 8 pages.

United States Patent and Trademark Office, "Non-Final Office Action," issued in connection with U.S. Appl. No. 15/625,664, dated Dec. 23, 2019, 11 pages.

* cited by examiner

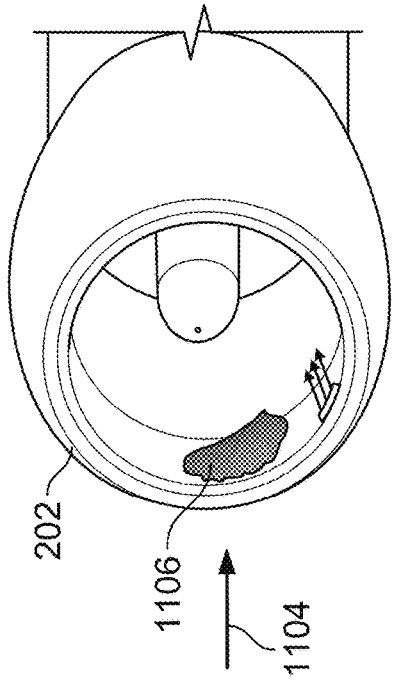
FIG. 11B
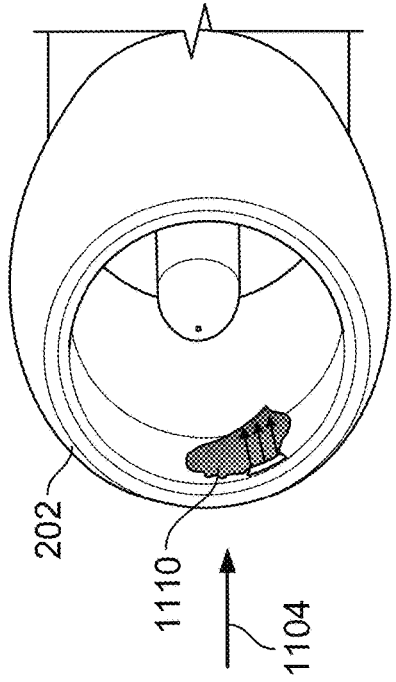
FIG. 11D
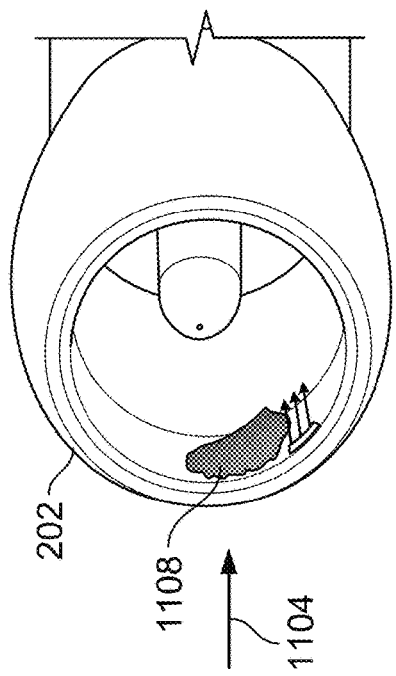
FIG. 11C
FIG. 11A

METHODS AND APPARATUS FOR REDUCING FLOW DISTORTION AT ENGINE FANS OF NACELLES

CROSS REFERENCE TO RELATED APPLICATIONS

This application arises from a continuation of U.S. patent application Ser. No. 15/625,664, filed Jun. 16, 2017. The entirety of U.S. patent application Ser. No. 15/625,664 is hereby incorporated herein by reference.

FIELD OF THE DISCLOSURE

This disclosure relates generally to aircraft engine nacelles and, more specifically, to methods and apparatus for reducing flow distortion at engine fans of nacelles.

BACKGROUND

Nacelles house aircraft engines, including the fans of the aircraft engines. Flow distortion (e.g., typically associated with separated flows) may occur proximate an engine fan of a nacelle during certain flight conditions of an aircraft. For example, flow distortion may occur between an inlet of a nacelle and an engine fan of the nacelle during takeoff and/or landing of an aircraft, particularly when crosswind conditions are present. Flow distortion occurring at an engine fan of a nacelle results in poor flow quality at the engine fan and, in severe instances of flow distortion, may lead to engine surge, and/or fatigue of the blades of the engine fan. It is therefore desirable to reduce or outright eliminate occurrences of flow distortion at engine fans of nacelles.

SUMMARY

In some examples, an apparatus for reducing flow distortion at an engine fan of a nacelle is disclosed. In some disclosed examples, the apparatus comprises a plurality of nozzles radially spaced about an inner wall of the nacelle. In some disclosed examples, respective ones of the nozzles are positioned to eject corresponding respective jets of fluid adjacent the inner wall in a downstream direction toward the engine fan. In some disclosed examples, the apparatus further comprises a controller to selectively activate the respective ones of the nozzles according to a time-based sequence. In some disclosed examples, the time-based sequence corresponds to a directional sequence that moves in an arcuate direction along a circumference of the inner wall.

In some examples, a method for reducing flow distortion at an engine fan of a nacelle is disclosed. In some disclosed examples, the method comprises selectively activating respective ones of a plurality of nozzles via a controller according to a time-based sequence. In some disclosed examples, the nozzles are radially spaced about an inner wall of the nacelle. In some disclosed examples, respective ones of the nozzles are positioned to eject corresponding respective jets of fluid adjacent the inner wall in a downstream direction toward the engine fan. In some disclosed examples, the time-based sequence corresponds to a directional sequence that moves in an arcuate direction along a circumference of the inner wall.

In some examples, a non-transitory machine readable storage medium comprising instructions is disclosed. In some disclosed examples, the instructions, when executed, cause a controller to selectively activate respective ones of a plurality of nozzles according to a time-based sequence. In some disclosed examples, the nozzles are radially spaced about an inner wall of a nacelle. In some disclosed examples, respective ones of the nozzles are positioned to eject corresponding respective jets of fluid adjacent the inner wall in a downstream direction toward an engine fan located within the nacelle. In some disclosed examples, the time-based sequence corresponds to a directional sequence that moves in an arcuate direction along a circumference of the inner wall.

In some examples, an apparatus for reducing flow distortion at an engine fan of a nacelle is disclosed. In some disclosed examples, the apparatus comprises a nozzle extending circumferentially about an inner wall of the nacelle. In some disclosed examples, the nozzle is positioned to eject a jet of fluid adjacent the inner wall in a downstream direction toward the engine fan. In some disclosed examples, the apparatus further comprises a controller to activate the nozzle according to a time-based sequence. In some disclosed examples, the time-based sequence corresponds to a directional sequence that moves in an arcuate direction along a circumference of the inner wall. In some disclosed examples, the apparatus further comprises a valve operatively coupled to the controller and operatively positioned to selectively enable fluid communication between a pressurized fluid source and the nozzle. In some disclosed examples, the controller is to actuate the valve to provide pressurized fluid from the pressurized fluid source to the nozzle. In some disclosed examples, the apparatus further comprises a disk including an orifice. In some disclosed examples, the controller is to rotate the disk in the arcuate direction around the inner wall of the nacelle to enable the nozzle to eject the jet of fluid through the orifice at corresponding locations of the orifice relative to the nozzle according to the time-based sequence.

In some examples, a method for reducing flow distortion at an engine fan of a nacelle is disclosed. In some disclosed examples, the method comprises actuating a valve via a controller to provide pressurized fluid from a pressurized fluid source to a nozzle. In some disclosed examples, the valve is operatively coupled to the controller and operatively positioned to selectively enable fluid communication between the pressurized fluid source and the nozzle. In some disclosed examples, the nozzle extends circumferentially about an inner wall of the nacelle. In some disclosed examples, the nozzle is positioned to eject a jet of fluid adjacent the inner wall in a downstream direction toward the engine fan according to a time-based sequence. In some disclosed examples, the time-based sequence corresponds to a directional sequence that moves in an arcuate direction along a circumference of the inner wall. In some disclosed examples, the method further comprises rotating a disk including an orifice in the arcuate direction around the inner wall of the nacelle via the controller to enable the nozzle to eject the jet of fluid through the orifice at corresponding locations of the orifice relative to the nozzle according to the time-based sequence.

In some examples, a non-transitory machine readable storage medium comprising instructions is disclosed. In some disclosed examples, the instructions, when executed, cause a controller to actuate a valve to provide pressurized fluid from a pressurized fluid source to a nozzle. In some disclosed examples, the valve is operatively coupled to the controller and operatively positioned to selectively enable fluid communication between the pressurized fluid source and the nozzle. In some disclosed examples, the nozzle extends circumferentially about an inner wall of a nacelle. In some disclosed examples, the nozzle is positioned to eject a jet of fluid adjacent the inner wall in a downstream direction toward the engine fan according to a time-based sequence. In some disclosed examples, the time-based sequence corresponds to a directional sequence that moves in an arcuate direction along a circumference of the inner wall. In some disclosed examples, the instructions, when executed further cause the controller to rotate a disk including an orifice in the arcuate direction around the inner wall of the nacelle to enable the nozzle to eject the jet of fluid through the orifice at corresponding locations of the orifice relative to the nozzle according to the time-based sequence.

BRIEF DESCRIPTION OF THE DRAWINGS

FIG. 11A is a perspective view of the example nacelle of FIGS. 3-5 illustrating a first example flow separation pattern occurring when the example nozzle activation apparatus of the example flow distortion reduction apparatus of FIG. 2 is not in operation.

FIG. 11B is a perspective view of the example nacelle of FIGS. 3-5 and 11A illustrating a first example instantaneous flow separation pattern occurring when the example nozzle activation apparatus of the example flow distortion reduction apparatus of FIG. 2 is operating at a first example time of an example time-based sequence.

FIG. 11C is a perspective view of the example nacelle of FIGS. 3-5, 11A and 11B illustrating a second example instantaneous flow separation pattern occurring when the example nozzle activation apparatus of the example flow distortion reduction apparatus of FIG. 2 is operating at a second example time of the example time-based sequence.

FIG. 11D is a perspective view of the example nacelle of FIGS. 3-5 and 11A-11C illustrating a third example instantaneous flow separation pattern occurring when the example nozzle activation apparatus of the example flow distortion reduction apparatus of FIG. 2 is operating at a third example time of the example time-based sequence.

Figure 1:
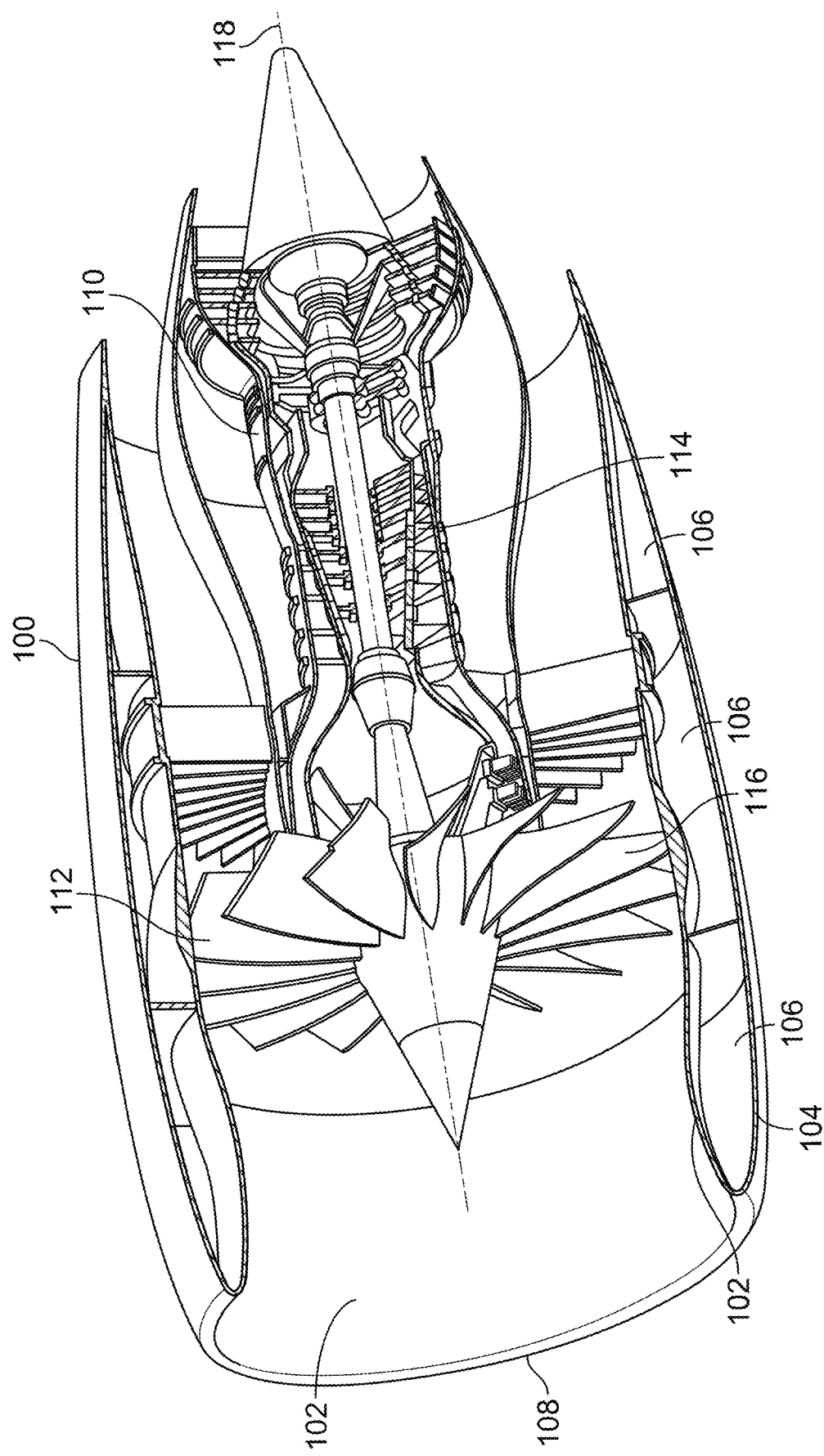
FIG. 1 is a partial cutaway perspective view illustrating an example nacelle in which a flow distortion reduction apparatus constructed in accordance with the teachings of this disclosure may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Aircraft and engine manufacturers are designing turbofan aircraft engines with ever higher bypass ratios to improve propulsive efficiency and to reduce fuel consumption of the engines. Such increased bypass ratio engines require correspondingly larger diameter nacelles. The increased size associated with such a larger diameter nacelle adversely increases the weight of the nacelle and also adversely increases the drag caused by the nacelle. It therefore becomes necessary to shorten the length of the nacelle in order to reduce (e.g., minimize) the weight and drag parameters of the nacelle.

Shorter-length nacelles (e.g., referred to herein as "compact" nacelles) may limit the performance of an aircraft. For example, flow distortion resulting from separated flows that may occur between an inlet of a compact nacelle and an engine fan of the compact nacelle during takeoff and/or landing of an aircraft, particularly when crosswind conditions are present. During such conditions, the flow distortion at the inlet of the compact nacelle may be substantial. Moreover, the flow distortion may extend downstream from the inlet (e.g., toward the engine fan) as a result of the reduced length of the compact nacelle. Flow distortion occurring at an engine fan of a compact nacelle results in poor flow quality at the engine fan and, in severe instances of flow distortion, may lead to engine surge, and/or fatigue of the blades of the engine fan. It is therefore desirable to reduce (e.g., eliminate) occurrences of flow distortion at engine fans of compact nacelles.

Conventional methods and apparatus for reducing flow distortion at an engine fan of a nacelle include decreasing the curvature of the lip of the inlet of the nacelle. Decreasing the curvature of the lip, however, adversely increases the thickness of the nacelle. Geometric constraints associated with the thickness of a nacelle in relation to a given diameter of an engine fan housed by the nacelle often limit the degree to which the curvature of the lip of the inlet of the nacelle may be reduced. Moreover, reducing the curvature of the lip of the inlet of the nacelle adversely increases the drag (e.g., cruise drag) associated with the nacelle.

Conventional methods and apparatus for reducing flow distortion at an engine fan of a nacelle also include implementing a flow injection system proximate the inlet of the nacelle. Known flow injection systems adversely require substantial amounts of engine bleed to facilitate operation of the flow injection systems. For example, substantial amounts of engine bleed may be necessary to activate nozzles of such known flow injection systems to eject jets and/or streams of fluid along an inner wall of a nacelle toward an engine fan of the nacelle. The requirement for relatively high amounts of engine bleed necessitates an engine of increased size, which adversely results in an engine of increased weight. Moreover, the need for relatively high amounts of engine bleed degrades the efficiency of the engine.

The above-described conventional methods and apparatus for reducing flow distortion at an engine fan of a nacelle fail to satisfy acceptable flow distortion and/or pressure loss levels at the engine fan in the absence of substantial amounts of engine bleed. Unlike such conventional methods and apparatus, the flow distortion reduction methods and apparatus disclosed herein advantageously reduce the flow distortion and pressure loss at an engine fan of a nacelle to acceptable levels while requiring a reduced amount of engine bleed relative to the known methods and apparatus described above.

In some examples, the disclosed flow distortion reduction methods and apparatus include a plurality of nozzles radially spaced about an inner wall of a nacelle. Respective ones of the nozzles are positioned to eject corresponding respective jets of fluid adjacent the inner wall of the nacelle in a downstream direction toward an engine fan of the nacelle. In some examples, a controller selectively activates the respective ones of the nozzles according to a time-based sequence that corresponds to a directional sequence which moves in an arcuate direction along a circumference of the inner wall of the nacelle.

As a result of selectively activating the respective ones of the nozzles according to the time-based sequence, the disclosed flow distortion reduction methods and apparatus advantageously provide continuous flow injection coverage relative to the circumferential section of the inner wall of the nacelle extending between the inlet of the nacelle and the engine fan of the nacelle, such that each arcuate portion and/or segment of the circumferential section is subjected to the injected flow at a corresponding time determined and/or defined by the time-based sequence. Selectively activating the respective ones of the nozzles of the disclosed flow distortion reduction methods and apparatus according to the time-based sequence energizes the boundary layer associated with a fluid flowing into and/or through the nacelle along the above-described circumferential section, thereby reducing the occurrence of flow distortion (e.g., separated flow associated with a fluid flowing along the inner wall of the nacelle) at the engine fan of the nacelle.

In other examples, the disclosed flow distortion reduction methods and apparatus include a nozzle extending circumferentially about an inner wall of a nacelle. The nozzle is positioned to eject a jet of fluid adjacent the inner wall of the nacelle in a downstream direction toward an engine fan of the nacelle. In some examples, a controller activates the nozzle according to a time-based sequence that corresponds to a directional sequence which moves in an arcuate direction along a circumference of the inner wall of the nacelle. In some examples, the controller rotates a disk including an orifice in the arcuate direction around the inner wall of the nacelle to enable the nozzle to eject the jet of fluid through the orifice at corresponding locations of the orifice relative to the nozzle according to the time-based sequence.

As a result of rotating the disk to enable the nozzle to eject the jet of fluid through the orifice at corresponding locations of the orifice relative to the nozzle according to the time-based sequence, the disclosed flow distortion reduction methods and apparatus advantageously provide continuous flow injection coverage relative to the circumferential section of the inner wall of the nacelle extending between the inlet of the nacelle and the engine fan of the nacelle, such that each arcuate portion and/or segment of the circumferential section is subjected to the injected flow at a corresponding time determined and/or defined by the time-based sequence. Rotating the disk to enable the nozzle to eject the jet of fluid through the orifice at corresponding locations of the orifice relative to the nozzle according to the time-based sequence energizes the boundary layer associated with a fluid flowing into and/or through the nacelle along the above-described circumferential section, thereby reducing the occurrence of flow distortion (e.g., separated flow associated with a fluid flowing along the inner wall of the nacelle) at the engine fan of the nacelle.

The disclosed flow distortion reduction methods and apparatus advantageously reduce flow distortion at the engine fan of the nacelle irrespective of the instantaneous direction of any crosswind that the nacelle may encounter during a flight of an aircraft to which the nacelle is coupled. Moreover, the disclosed flow distortion reduction methods and apparatus advantageously reduce flow distortion at the engine fan of the nacelle while requiring a relatively low amount of engine bleed to facilitate the selective activation of the respective ones of the nozzles.

FIG. 1 is a partial cutaway perspective view illustrating an example nacelle 100 in which a flow distortion reduction apparatus constructed in accordance with the teachings of this disclosure may be implemented. The nacelle 100 of FIG. 1 includes an example inner wall 102, an example outer wall 104, one or more example interior compartment(s) 106 located between the inner wall 102 and the outer wall 104, and an example inlet 108. A fluid (e.g., air) may flow into the inlet 108 of the nacelle 100 during operation (e.g., a flight) of an aircraft to which the nacelle 100 of FIG. 1 may be coupled.

In the illustrated example of FIG. 1, the nacelle 100 houses and/or contains an example engine 110. The engine 110 of FIG. 1 includes an example engine fan 112 and an example compressor 114. The engine fan 112 is located downstream and/or aft of the inlet 108 of the nacelle 100. In the illustrated example of FIG. 1, the engine fan 112 includes example fan blades 116 that extend away from an example longitudinal axis 118 of the engine 110 toward the inner wall 102 of the nacelle 100. In some examples, the compressor 114 of the engine 110 of FIG. 1 may produce and/or generate a pressurized fluid (e.g., bleed air from the engine 110) that may be routed (e.g., via a conduit) and/or otherwise distributed from the compressor 114 of the engine 110 to one or more other component(s) and/or other area(s) of the nacelle 100 of FIG. 1. For example, pressurized fluid produced and/or generated by the compressor 114 of the engine 110 may be routed and/or otherwise distributed to the interior compartment(s) 106 of the nacelle 100 of FIG. 1, and/or to one or more component(s) located within the interior compartment(s) 106 of the nacelle 100 of FIG. 1.

In some examples, the flow distortion reduction methods and apparatus disclosed herein may be implemented in conjunction with the nacelle 100 of FIG. 1. For example, the flow distortion reduction apparatus disclosed herein may include a plurality of nozzles positioned in a radially-spaced-apart arrangement and/or configuration within the interior compartment(s) 106 of the nacelle 100 of FIG. 1 about the inner wall 102 of the nacelle 100 of FIG. 1. As another example, the flow distortion reduction apparatus disclosed herein may include a single nozzle positioned within the interior compartment(s) 106 of the nacelle 100 of FIG. 1 and extending circumferentially about the inner wall 102 of the nacelle 100 of FIG. 1. The disclosed flow distortion reduction apparatus may further include a nozzle activation apparatus located within the interior compartment(s) 106 of the nacelle 100 of FIG. 1. In some examples, the nozzle activation apparatus may include a controller, one or more controllable device(s) (e.g., valves and/or other actuatable structures) to be controlled by the controller, and a memory for storing a time-based sequence and/or a directional sequence to be implemented by the controller in relation to the controllable device(s) and/or the nozzle(s). In some examples, the controllable device(s) of the nozzle activation apparatus may be in fluid communication with the compressor 114 of the engine 110 of FIG. 1 such that pressurized fluid (e.g., bleed air) produced and/or generated by the compressor 114 of the engine 110 is routed and/or otherwise distributed from the compressor 114 to the controllable device(s).

Figure 2:
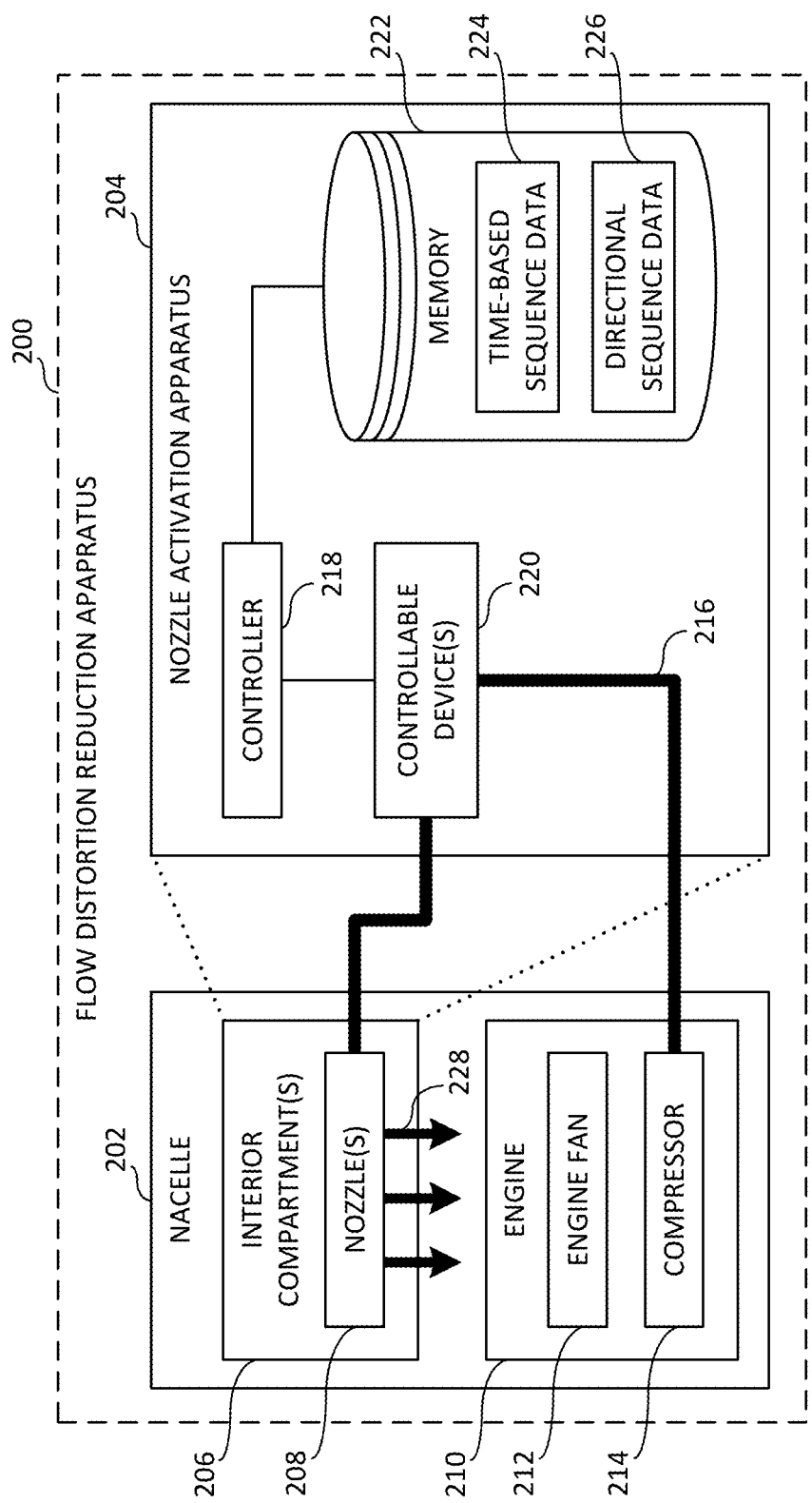
FIG. 2 is a block diagram of an example flow distortion reduction apparatus constructed in accordance with the teachings of this disclosure.

FIG. 2 is a block diagram of an example flow distortion reduction apparatus 200 constructed in accordance with the teachings of this disclosure. The flow distortion reduction apparatus 200 of FIG. 2 includes an example nacelle 202 and an example nozzle activation apparatus 204. In the illustrated example of FIG. 2, the nacelle 202 includes one or more example interior compartment(s) 206 located between an inner wall and an outer wall of the nacelle 202 in a manner similar to that described above in relation to the inner wall 102, the outer wall 104, and the interior compartment(s) 106 of the nacelle 100 of FIG. 1. As further described below in conjunction with FIGS. 3-5, 6A-6C, 7A-7C, 8A-8C, 9A-9C, and 10A-10C, one or more example nozzle(s) 208 is/are located within the interior compartment(s) 206 of the nacelle 202 of FIG. 2. In the illustrated example of FIG. 2, the nacelle 202 further includes (e.g., houses and/or contains) an example engine 210. The engine 210 of FIG. 2 includes an example engine fan 212 and an example compressor 214. The compressor 214 of the engine 210 of FIG. 2 produces and/or generates example pressurized fluid 216 (e.g., bleed air) that may be routed and/or distributed to the example nozzle activation apparatus 204 of FIG. 2.

In the illustrated example of FIG. 2, the nozzle activation apparatus 204 includes an example controller 218. The nozzle activation apparatus 204 of FIG. 2 further includes one or more example controllable device(s) 220 to be controlled by the controller 218 of FIG. 2. The nozzle activation apparatus 204 of FIG. 2 further includes an example memory 222 for storing example time-based sequence data 224 and example directional sequence data 226 to be implemented via the controller 218 of FIG. 2 in relation to the one or more controllable device(s) 220 of FIG. 2 and/or the one or more nozzle(s) 208 of FIG. 2. While the example controller 218 of FIG. 2 is generally illustrated and described herein as being a single device, the controller 218 of FIG. 2 may additionally and/or alternatively be implemented via multiple devices, including any number of controllers, microcontrollers, processors, and/or microprocessors respectively configured to perform one or more of the control functions, control processes, and/or control operations described herein.

The controller 218 of FIG. 2 is operatively coupled to (e.g., in electrical communication with) the controllable device(s) 220 of FIG. 2 and the memory 222 of FIG. 2. The controllable device(s) 220 of FIG. 2 is/are in fluid communication with the compressor 214 of the engine 210 of FIG. 2 such that the pressurized fluid 216 produced and/or generated by the compressor 214 is received by and/or at the controllable device(s) 220. The controller 218 of FIG. 2 actuates (e.g., opens, rotates, etc.) the controllable device(s) 220 of FIG. 2 via one or more control signal(s) transmitted by the controller 218 to the controllable device(s) 220. In some examples, the controller 218 transmits the control signal(s) to the controllable device(s) 220 according to a time-based sequence (e.g., the time-based sequence data 224 of FIG. 2) and/or a directional sequence (e.g., the directional sequence data 226 of FIG. 2) implemented by the controller 218.

In some examples, the controllable devices 220 may be implemented as a plurality of valves in selective fluid communication with a corresponding plurality of the nozzles 208 (as described below in connection with the examples of FIGS. 3-5 and 6A-6C). In such examples, respective ones of the controllable devices 220 (e.g., respective ones of the valves) that are selectively actuated by the controller 218 of FIG. 2 enable the pressurized fluid 216 received by and/or at the controllable devices 220 from the compressor 214 of the engine 210 of FIG. 2 to be selectively routed and/or selectively distributed to the corresponding ones of the nozzles 208 of the nacelle 202 of FIG. 2 according to the time-based sequence and/or the directional sequence implemented by the controller 218. The receipt of the pressurized fluid 216 at the corresponding ones of the nozzles 208 of FIG. 2 activates and/or causes the corresponding ones of the nozzles 208 to eject corresponding example fluid jets 228 according to the time-based sequence and/or the directional sequence implemented by the controller 218. Thus, by selectively actuating the controllable devices 220 of FIG. 2, the controller 218 of FIG. 2 selectively activates respective ones of the nozzles 208 of the nacelle 202 of FIG. 2 according to the time based sequence and/or the directional sequence implemented by the controller 218.

In other examples, the controllable devices 220 may be implemented as a valve in selective fluid communication with a plurality of the nozzles 208, and a rotatable disk including an orifice (as described below in connection with the examples of FIGS. 7A-7C and 8A-8C). In such examples, actuation of the valve via the controller 218 of FIG. 2 enables the pressurized fluid 216 received by and/or at the valve from the compressor 214 of the engine 210 of FIG. 2 to be routed and/or distributed to the nozzles 208 of the nacelle 202 of FIG. 2. Actuation (e.g., rotation) of the rotatable disk according to the time-based sequence and/or the directional sequence implemented by the controller 218 causes the orifice of the disk to be selectively aligned with respective ones of the nozzles 208. When the orifice is aligned with one of the nozzles 208, the aligned one of the nozzles 208 ejects a corresponding one of the fluid jets 228 according to the time-based sequence and/or the directional sequence implemented by the controller 218. Thus, by actuating the controllable devices 220 of FIG. 2, the controller 218 of FIG. 2 selectively activates respective ones of the nozzles 208 of the nacelle 202 of FIG. 2 according to the time based sequence and/or the directional sequence implemented by the controller 218.

In still other examples, the controllable devices 220 may be implemented as a valve in selective fluid communication with a single nozzle 208, and a rotatable disk including an orifice (as described below in connection with the examples of FIGS. 9A-9C and 10A-10C). In such examples, actuation of the valve via the controller 218 of FIG. 2 enables the pressurized fluid 216 received by and/or at the valve from the compressor 214 of the engine 210 of FIG. 2 to be routed and/or distributed to the nozzle 208 of the nacelle 202 of FIG. 2. Actuation (e.g., rotation) of the rotatable disk according to the time-based sequence and/or the directional sequence implemented by the controller 218 causes the orifice of the disk to enable the nozzle 208 to eject the fluid jet 228 through the orifice at corresponding locations of the orifice relative to the nozzle 208 according to the time-based sequence.

The memory 222 of FIG. 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 222 of FIG. 2 may be stored in any file and/or data structure format, organization scheme, and/or arrangement. In some examples, the memory 222 stores time-based sequence data 224 and directional sequence data 226 respectively corresponding to one or more time-based sequence(s) and one or more directional sequence(s) to be implemented by the controller 218 of FIG. 2. The memory 222 of FIG. 2 is accessible to the example controller 218 of FIG. 2, and/or, more generally, to the example nozzle activation apparatus 204 of FIG. 2.

In some examples, one or more of the controller 218, the controllable device(s) 220, the memory 222, and/or, more generally, the nozzle activation apparatus 204 of FIG. 2 may be located within one or more of the interior compartment(s) 206 of the nacelle 202 of FIG. 2. In other examples, one or more of the controller 218, the controllable device(s) 220, the memory 222, and/or, more generally, the nozzle activation apparatus 204 of FIG. 2 may be located externally relative to the interior compartment(s) 206 of the nacelle 202 of FIG. 2. For example, one or more of the controller 218, the controllable device(s) 220, the memory 222, and/or, more generally, the nozzle activation apparatus 204 of FIG. 2 may be located within a wing and/or a fuselage of an aircraft to which the nacelle 202 of FIG. 2 may be coupled.

Figure 3:
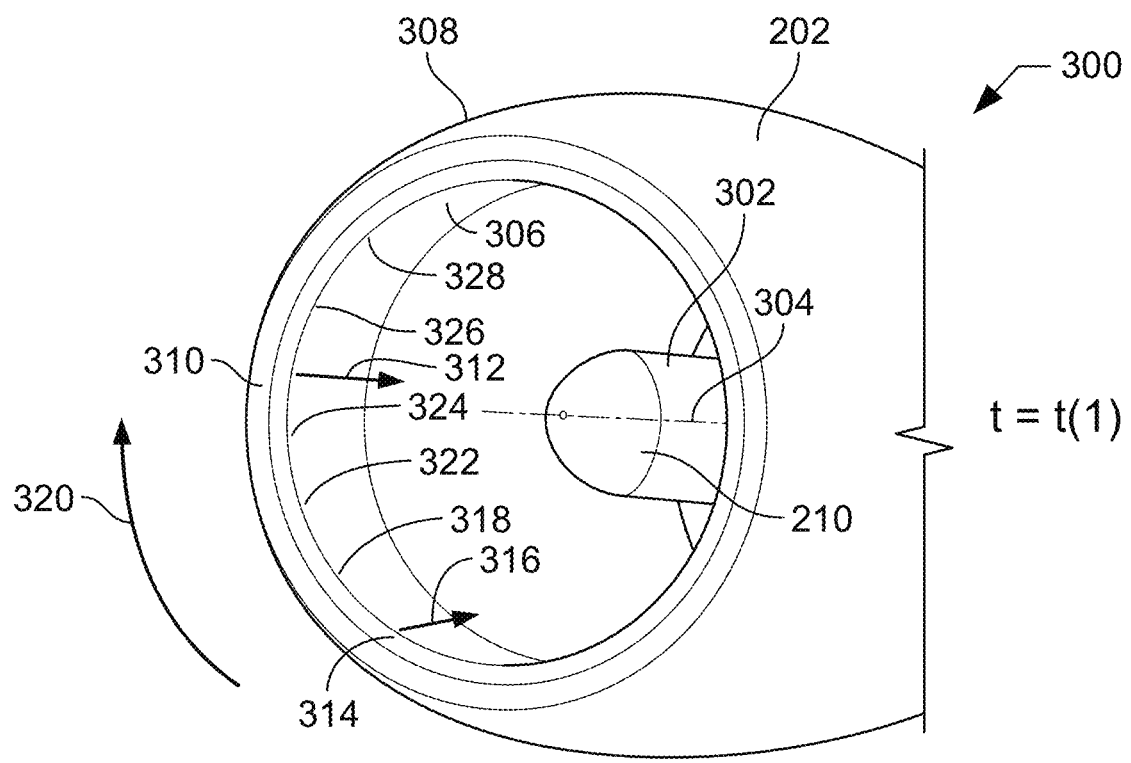
FIG. 3 is a perspective view of a first example implementation of the example nacelle of the example flow distortion reduction apparatus of FIG. 2.
Figure 4:
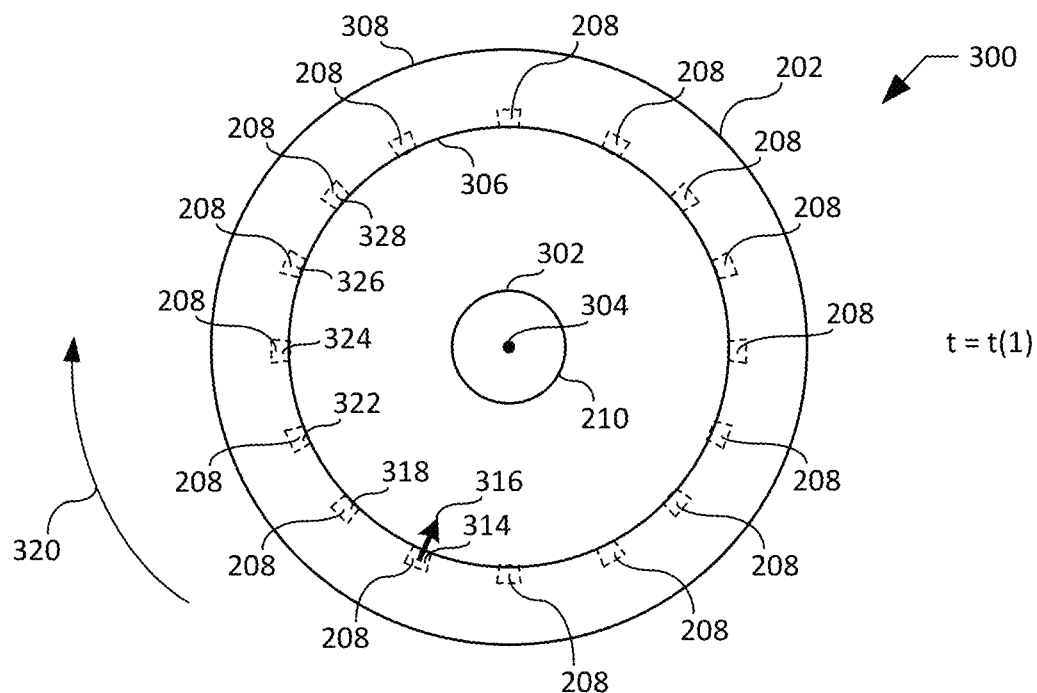
FIG. 4 is a front view of the example nacelle of FIG. 3.

FIG. 3 is a perspective view of a first example implementation 300 of the example nacelle 202 of the example flow distortion reduction apparatus 200 of FIG. 2. FIG. 4 is a front view of the example nacelle 202 of FIG. 3. In the illustrated example of FIGS. 3 and 4, the nacelle 202 houses and/or contains the example engine 210 of FIGS. 2-4. The engine 210 of FIGS. 3 and 4 includes an example engine hub 302 having an example central axis 304. The engine 210 of FIGS. 3 and 4 further includes an engine fan and a compressor (not shown in FIGS. 3 and 4) respectively corresponding to the example engine fan 212 and the example compressor 214 of FIG. 2 described above.

In the illustrated example of FIGS. 3 and 4, the nacelle 202 includes an example inner wall 306, an example outer wall 308, and an example inlet 310. The nacelle 202 of FIGS. 3 and 4 further includes one or more interior compartment(s) (not visible in FIGS. 3 and 4) located between the inner wall 306 and the outer wall 308 of FIGS. 3 and 4, and corresponding to the example interior compartment(s) 206 of FIG. 2 described above. The nacelle 202 of FIGS. 3 and 4 further includes the example nozzles 208 of FIG. 2-4.

In the illustrated example of FIGS. 3 and 4, respective ones of the nozzles 208 are radially spaced about the inner wall 306 of the nacelle 202 (e.g., within the interior compartment(s) of the nacelle 202). While the example of FIGS. 3 and 4 illustrates a total of sixteen (16) nozzles 208 that are radially spaced apart from one another about the inner wall 306 of the nacelle 202 in an equal manner (e.g., adjacent ones of the nozzles 208 being positioned at radial intervals of approximately 22.5 degrees), the nacelle 202 may include any number of nozzles 208, and the radial spacing between the respective one of the nozzles 208 may differ from that shown in the example of FIGS. 3 and 4. In some examples, the nozzles 208 may be radially spaced apart from one another about the inner wall 306 of the nacelle 202 in an unequal manner (e.g., adjacent ones of the nozzles 208 being positioned at different radial intervals relative to one another).

In the illustrated example of FIGS. 3 and 4, the respective ones of the radially-spaced-apart nozzles 208 are positioned to eject corresponding respective jets of fluid adjacent the inner wall 306 of the nacelle 202 in an example downstream direction 312 toward the engine fan of the engine 210 (e.g., in a direction along the central axis 304 of the engine hub 302 of the engine 210). Respective ones of the fluid jets are ejected from corresponding respective ones of the nozzles 208 of FIGS. 3 and 4 according to a time-based sequence and a directional sequence.

For example, a first example nozzle 314 of FIGS. 3 and 4 may be controlled to eject a first example fluid jet 316 at a first example time (e.g., t=t(1)) of an example time-based sequence, as shown in FIGS. 3 and 4. A second example nozzle 318 of FIGS. 3 and 4 positioned radially adjacent to the first nozzle 314 may be controlled to eject a second example fluid jet (not shown in FIGS. 3 and 4) at a second example time (e.g., t=t(2)) of the time-based sequence subsequent to the first time of the time-based sequence. The first nozzle 314 of FIGS. 3 and 4 may further be controlled to stop and/or cease ejecting the first fluid jet 316 at the second time (e.g., t=t(2)) of the time-based sequence, or at any other time (e.g., t=t(3)) subsequent to the first time (e.g., t=t(1)) of the time-based sequence. Thus, the time-based sequence for controlling the respective fluid jet ejections of the first nozzle 314 and the second nozzle 318 of FIGS. 3 and 4 corresponds to an example directional sequence that moves in an example arcuate direction 320 (e.g., clockwise in the example of FIGS. 3 and 4) along the inner wall 306 of the nacelle 202 (e.g., along a circumference of the inner wall 306).

In other examples, sets and/or groups of radially-adjacent ones of the nozzles 208 of FIGS. 3 and 4 may be controlled to eject corresponding fluid jets according to a time-based sequence and a directional sequence. For example, a first set of radially-adjacent ones of the nozzles 208 including the first nozzle 314, the second nozzle 318, and a third example nozzle 322 of FIGS. 3 and 4 may be controlled to eject a first set of fluid jets (not shown in FIGS. 3 and 4) at a first example time (e.g., t=t(1)) of an example time-based sequence. A second set of radially-adjacent ones of the nozzles 208 including a fourth example nozzle 324, a fifth example nozzle 326, and a sixth example nozzle 328 of FIGS. 3 and 4 may be controlled to eject a second set of fluid jets (not shown in FIGS. 3 and 4) at a second example time (e.g., t=t(2)) of an example time-based sequence subsequent to the first time of the time-based sequence. The first set of the nozzles 208 may further be controlled to stop and/or cease ejecting the first set of fluid jets at the second time (e.g., t=t(2)) of the time-based sequence, or at any other time (e.g., t=t(3)) subsequent to the first time (e.g., t=t(1)) of the time-based sequence. Thus, the time-based sequence for controlling the respective fluid jet ejections of the first set and the second set of the nozzles 208 corresponds to an example directional sequence that moves in the arcuate direction 320 (e.g., clockwise in the example of FIGS. 3 and 4) along the inner wall 306 of the nacelle 202 (e.g., along a circumference of the inner wall 306).

Figure 5:
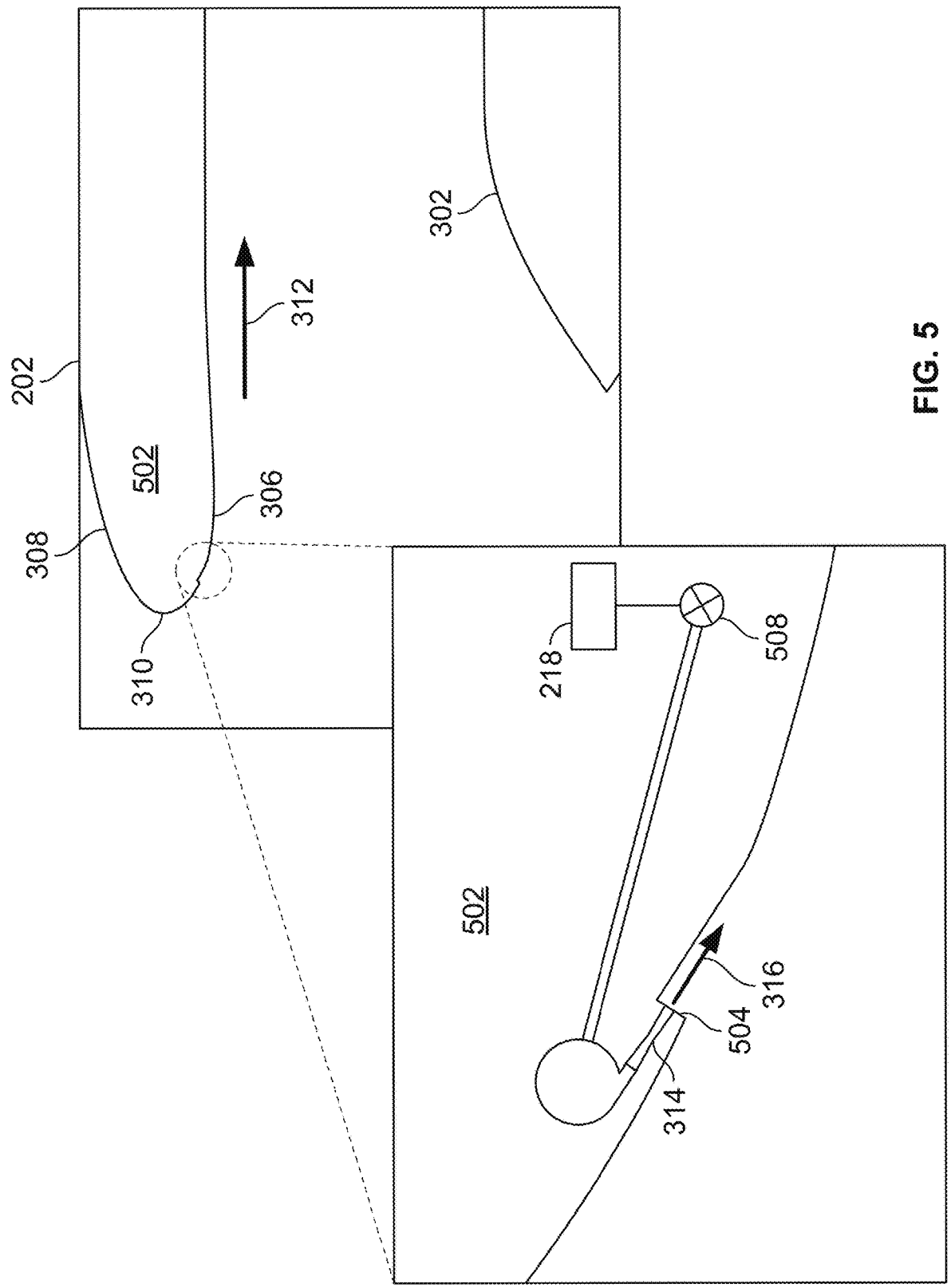
FIG. 5 is a partial cross-sectional view of the example nacelle of FIGS. 3 and 4 taken along the example central axis of the example engine hub of the example engine of FIGS. 3 and 4.

FIG. 5 is a partial cross-sectional view of the example nacelle 202 of FIGS. 3 and 4 taken along the example central axis 304 of the example engine hub 302 of the example engine 210 of FIGS. 3 and 4. In the illustrated example of FIG. 5, the first nozzle 314 of FIGS. 3 and 4 is shown located between the inner wall 306 and the outer wall 308 of the nacelle 202 of FIGS. 3 and 4 within a first example interior compartment 502 (e.g., an interior compartment from among the example interior compartment(s) 206 of FIG. 2 described above). The first nozzle 314 is positioned to eject the first fluid jet 316 adjacent the inner wall 306 of the nacelle 202 in the downstream direction 312 shown in FIG. 5 and described above in connection with FIGS. 3 and 4. In the illustrated example of FIG. 5, the first nozzle 314 is positioned against and/or aligned with an example rearward-facing stepped aperture 504 formed in the inner wall 306. The positioning of the first nozzle 314 relative to the rearward-facing stepped aperture 504 of the inner wall 306 facilitates the ejection of the first fluid jet 316 by the first nozzle 314 adjacent the inner wall 306 in the downstream direction 312.

In the illustrated example of FIG. 5, the controller 218 of FIG. 2 and a first example controllable device 508 (e.g., a valve) from among the controllable device(s) 220 of FIG. 2 are also shown located within the first interior compartment 502 of the nacelle 202. The controller 218 of FIG. 5 is operatively coupled to the first controllable device 508 of FIG. 5. The first controllable device 508 of FIG. 5 is in fluid communication with a compressor (not visible in FIG. 5) of the engine 210 of FIG. 5 such that pressurized fluid produced and/or generated by the compressor is received by and/or at the first controllable device 508. The controller 218 of FIG. 5 actuates (e.g., opens) the first controllable device 508 of FIG. 5 via one or more control signal(s) transmitted by the controller 218 to the first controllable device 508 according to a time-based sequence implemented by the controller 218 of FIG. 5.

In response to being actuated by the controller 218 of FIG. 5, the first controllable device 508 of FIG. 5 enables the pressurized fluid received by and/or at the first controllable device 508 from the compressor of the engine 210 of FIG. 5 to be routed and/or distributed to the first nozzle 314 of FIG. 5 according to the time-based sequence implemented by the controller 218. The receipt of the pressurized fluid at the first nozzle 314 of FIG. 5 activates and/or causes the first nozzle 314 to eject the first fluid jet 316 according to the time-based sequence. Thus, by actuating the first controllable device 508 of FIG. 5, the controller 218 of FIG. 5 activates the first nozzle 314 of FIG. 5 according to the time based sequence implemented by the controller 218.

Figure 6A:
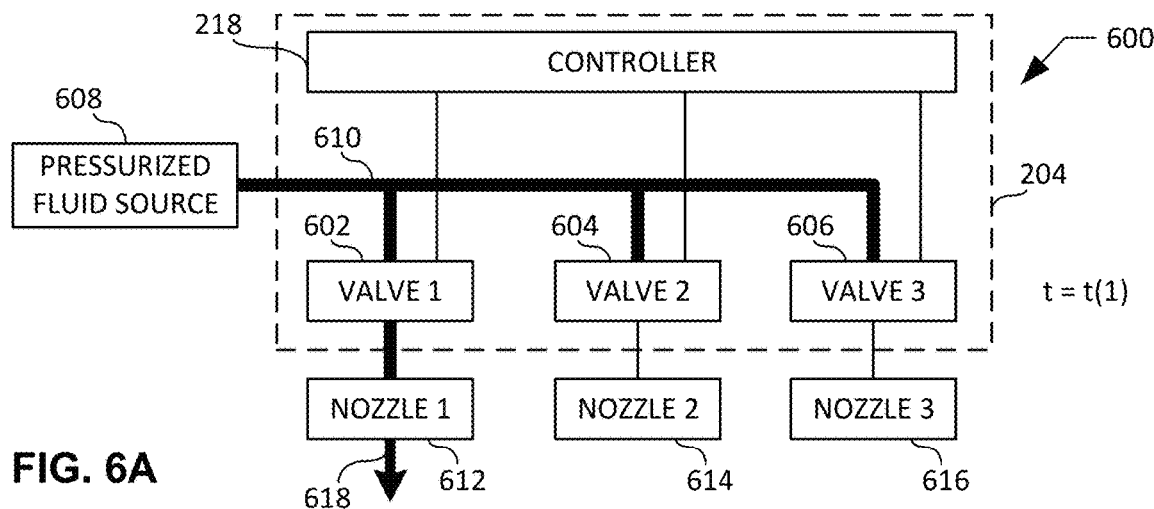
FIG. 6A is a block diagram of a first example implementation of the example nozzle activation apparatus of FIG. 2 operating at a first example time of an example time-based sequence.
Figure 6B:
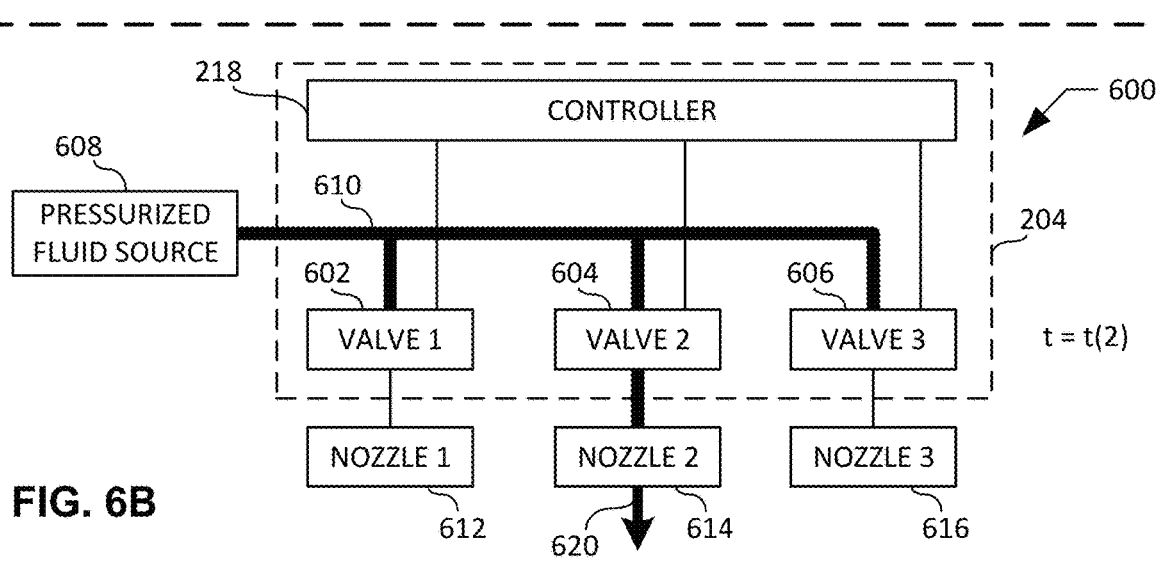
FIG. 6B is a block diagram of the example nozzle activation apparatus of FIG. 6A operating at a second example time of the example time-based sequence.
Figure 6C:
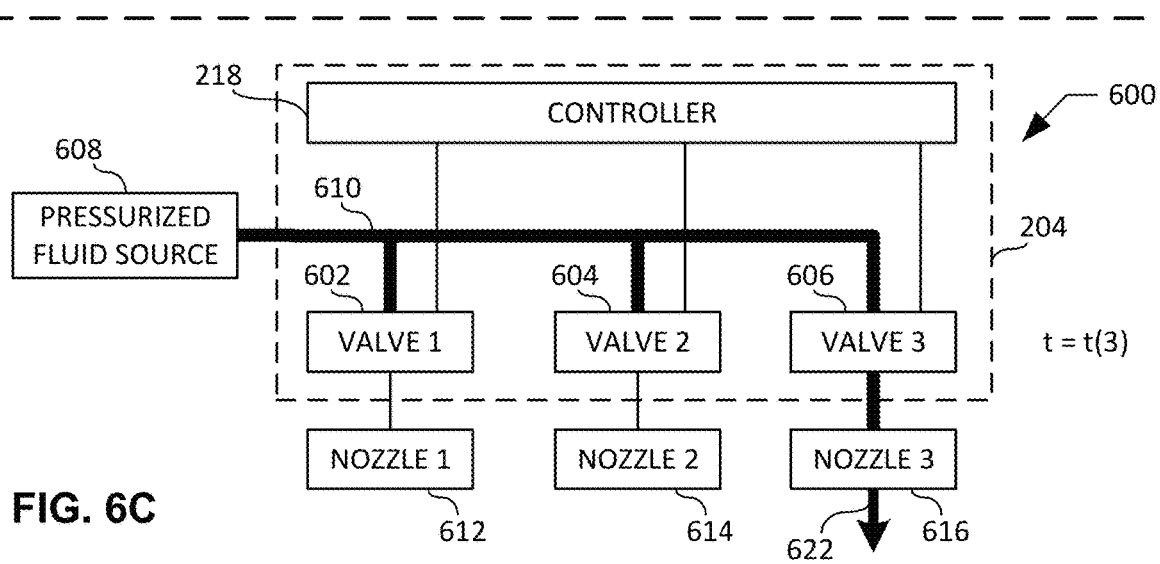
FIG. 6C is a block diagram of the example nozzle activation apparatus of FIGS. 6A and 6B operating at a third example time of the example time-based sequence.

FIG. 6A is a block diagram of a first example implementation 600 of the example nozzle activation apparatus 204 of FIG. 2 operating at a first example time (e.g., t=t(1)) of an example time-based sequence. FIG. 6B is a block diagram of the example nozzle activation apparatus 204 of FIG. 6A operating at a second example time (e.g., t=t(2)) of the example time-based sequence. FIG. 6C is a block diagram of the example nozzle activation apparatus 204 of FIGS. 6A and 6B operating at a third example time (e.g., t=t(3)) of the example time-based sequence.

In the illustrated example of FIGS. 6A-6C, the nozzle activation apparatus 204 includes the example controller 218 of FIG. 2. The nozzle activation apparatus 204 of FIGS. 6A-6C further includes the example controllable device(s) 220 of FIG. 2 implemented as a plurality of valves. More specifically, the nozzle activation apparatus 204 of FIGS. 6A-6C includes a first example valve 602, a second example valve 604, and a third example valve 606. The controller 218 of FIGS. 6A-6C is operatively coupled to the first valve 602, the second valve 604, and the third valve 606. An example pressurized fluid source 608 is in fluid communication with the first valve 602, the second valve 604, and the third valve 606. The pressurized fluid source 608 produces and/or generates example pressurized fluid 610 that is routed and/or distributed to the first valve 602, the second valve 604, and the third valve 606. In some examples, the pressurized fluid source 608 may be implemented as the compressor 214 of the engine 210 of FIG. 2 described above.

As further shown in the example of FIGS. 6A-6C, respective ones of the first valve 602, the second valve 604, and the third valve 606 are in selective fluid communication with corresponding respective ones of a first example nozzle 612, a second example nozzle 614, and a third example nozzle 616. While the example nozzle activation apparatus 204 of FIGS. 6A-6C is illustrated as including a total of three (3) valves, with each valve being in selective fluid communication with a corresponding respective one of three (3) nozzles, the nozzle activation apparatus 204 may include any number of valves in selective fluid communication with any number of nozzles.

The controller 218 of FIGS. 6A-6C selectively actuates (e.g., opens) respective ones of the first valve 602, the second valve 604, and the third valve 606 via one or more control signal(s) transmitted by the controller 218. In some examples, the controller 218 transmits the control signal(s) to the respective ones of the first valve 602, the second valve 604, and the third valve 606 according to a time-based sequence implemented by the controller 218. In some examples, the time-based sequence corresponds to a directional sequence based on the respective locations of the first nozzle 612, the second nozzle 614, and the third nozzle 616 relative to one another.

In response to being selectively actuated by the controller 218, the selectively actuated one(s) of the first valve 602, the second valve 604, and/or the third valve 606 enable(s) the pressurized fluid 610 received by and/or at the first valve 602, the second valve 604, and the third valve 606 to be selectively routed and/or selectively distributed to corresponding respective one(s) of the first nozzle 612, the second nozzle 614, and/or the third nozzle 616 according to the time-based sequence. The receipt of the pressurized fluid 610 at the corresponding one(s) of the first nozzle 612, the second nozzle 614, and/or the third nozzle 616 activates and/or causes the corresponding one(s) of the first nozzle 612, the second nozzle 614, and/or the third nozzle 616 to eject corresponding fluid jet(s) according to the time-based sequence.

For example, as shown in FIG. 6A, the controller 218 selectively actuates (e.g., opens) the first valve 602 at the first time (t=t(1)) of the time-based sequence. In response to the selective actuation of the first valve 602 by the controller 218, the first valve 602 enables the pressurized fluid 610 to be routed and/or distributed to the first nozzle 612. The receipt of the pressurized fluid 610 at the first nozzle 612 activates and/or causes the first nozzle 612 to eject a first example fluid jet 618. In the illustrated example of FIG. 6A, the second valve 604 and the third valve 606 are not currently actuated (e.g., opened) by the controller 218. Thus, only the first nozzle 612 from among the illustrated nozzles 612, 614, 616 of FIG. 6A ejects a fluid jet at the first time (t=t(1)) of the time-based sequence.

Continuing with the above example, the controller 218 selectively actuates (e.g., opens) the second valve 604 at the second time (t=t(2)) of the time-based sequence, as shown in FIG. 6B. In response to the selective actuation of the second valve 604 by the controller 218, the second valve 604 enables the pressurized fluid 610 to be routed and/or distributed to the second nozzle 614. The receipt of the pressurized fluid 610 at the second nozzle 614 activates and/or causes the second nozzle 614 to eject a second example fluid jet 620. In the illustrated example of FIG. 6B, the first valve 602 and the third valve 606 are not currently actuated (e.g., opened) by the controller 218. Thus, only the second nozzle 614 from among the illustrated nozzles 612, 614, 616 of FIG. 6B ejects a fluid jet at the second time (t=t(2)) of the time-based sequence.

Continuing with the above example, the controller 218 selectively actuates (e.g., opens) the third valve 606 at the third time (t=t(3)) of the time-based sequence, as shown in FIG. 6C. In response to the selective actuation of the third valve 606 by the controller 218, the third valve 606 enables the pressurized fluid 610 to be routed and/or distributed to the third nozzle 616. The receipt of the pressurized fluid 610 at the third nozzle 616 activates and/or causes the third nozzle 616 to eject a third example fluid jet 622. In the illustrated example of FIG. 6C, the first valve 602 and the second valve 604 are not currently actuated (e.g., opened) by the controller 218. Thus, only the third nozzle 616 from among the illustrated nozzles 612, 614, 616 of FIG. 6C ejects a fluid jet at the third time (t=t(3)) of the time-based sequence.

As demonstrated by the above-described example of FIGS. 6A-6C, the controller 218 selectively actuates (e.g., opens) respective ones of the first valve 602, the second valve 604, and the third valve 606 according to the time-based sequence to selectively activate corresponding respective ones of the of the first nozzle 612, the second nozzle 614, and the third nozzle 616 according to the time-based sequence.

Figure 7A:
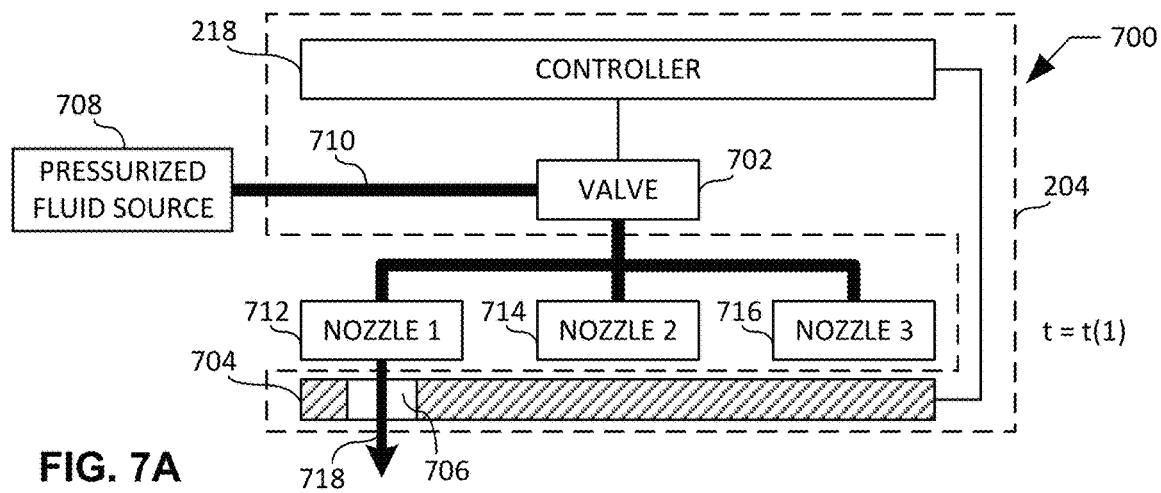
FIG. 7A is a block diagram of a second example implementation of the example nozzle activation apparatus of FIG. 2 operating at a first example time of an example time-based sequence.
Figure 7B:
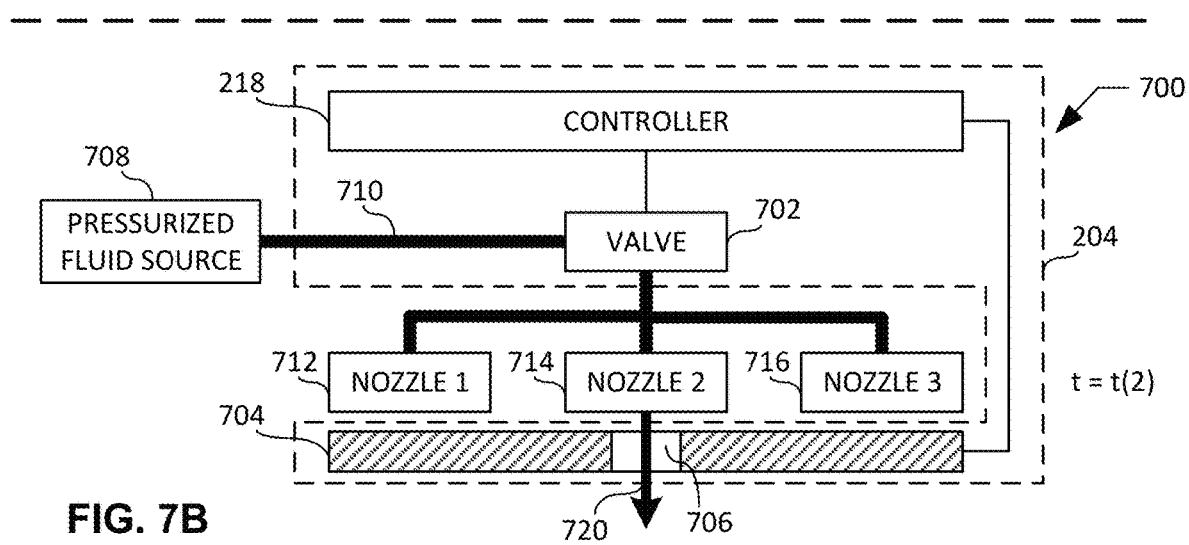
FIG. 7B is a block diagram of the example nozzle activation apparatus of FIG. 7A operating at a second example time of the example time-based sequence.
Figure 7C:
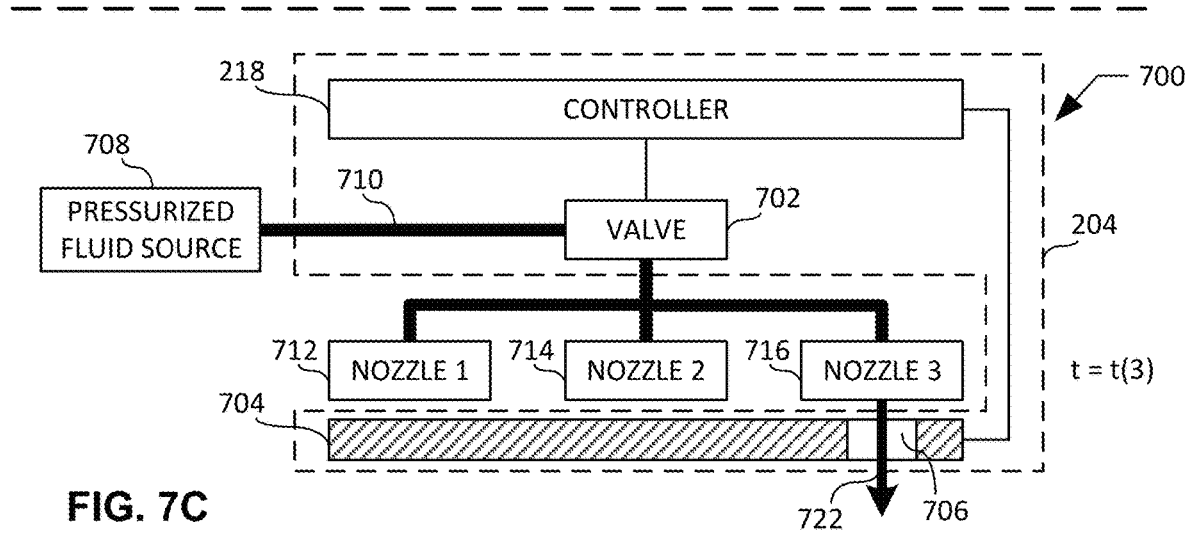
FIG. 7C is a block diagram of the example nozzle activation apparatus of FIGS. 7A and 7B operating at a third example time of the example time-based sequence.
Figure 8A:
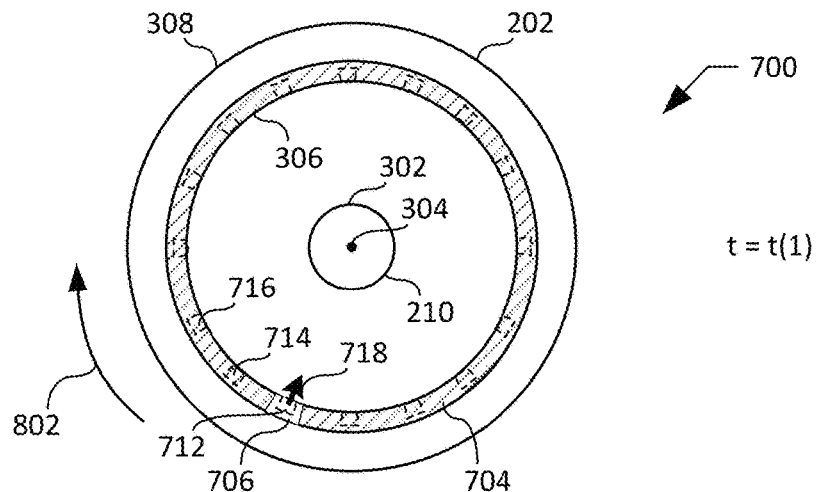
FIG. 8A is a front view of the example nacelle of FIGS. 3-5 modified to illustrate the example nozzle activation apparatus of FIGS. 7A-7C operating at the first example time of the example time-based sequence.
Figure 8B:
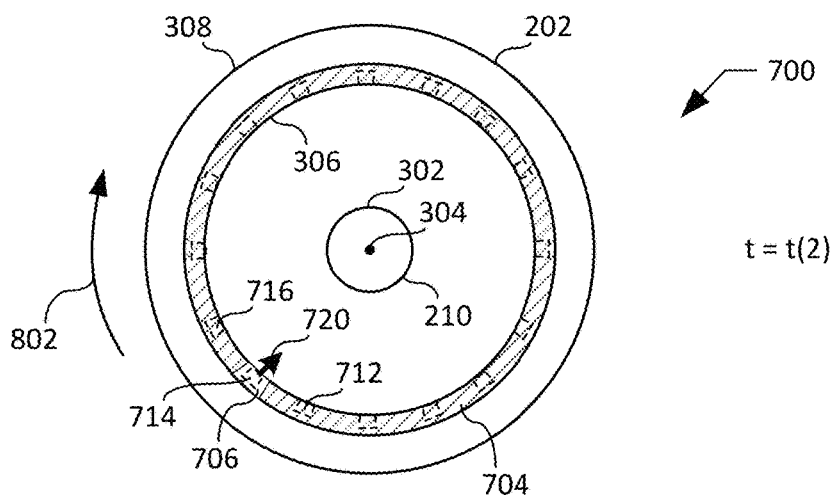
FIG. 8B is a front view of the example nacelle of FIGS. 3-5 modified to illustrate the example nozzle activation apparatus of FIGS. 7A-7C and 8A operating at the second example time of the example time-based sequence.
Figure 8C:
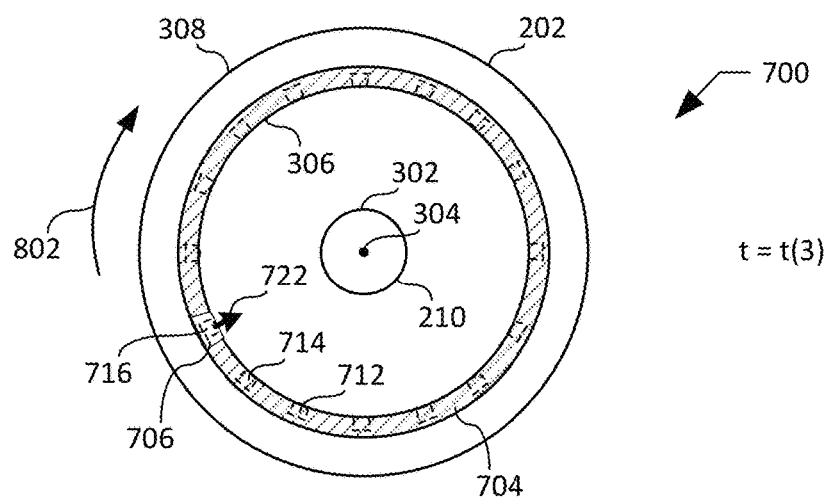
FIG. 8C is a front view of the example nacelle of FIGS. 3-5 modified to illustrate the example nozzle activation apparatus of FIGS. 7A-7C, 8A and 8B operating at the third example time of the example time-based sequence.

FIG. 7A is a block diagram of a second example implementation 700 of the example nozzle activation apparatus 204 of FIG. 2 operating at a first example time (e.g., t=t(1)) of an example time-based sequence. FIG. 7B is a block diagram of the example nozzle activation apparatus 204 of FIG. 7A operating at a second example time (e.g., t=t(2)) of the example time-based sequence. FIG. 7C is a block diagram of the example nozzle activation apparatus 204 of FIGS. 7A and 7B operating at a third example time (e.g., t=t(3)) of the example time-based sequence. FIG. 8A is a front view of the example nacelle 202 of FIGS. 3-5 modified to illustrate the example nozzle activation apparatus 204 of FIGS. 7A-7C operating at the first example time of the example time-based sequence. FIG. 8B is a front view of the example nacelle 202 of FIGS. 3-5 modified to illustrate the example nozzle activation apparatus 204 of FIGS. 7A-7C and 8A operating at the second example time of the example time-based sequence. FIG. 8C is a front view of the example nacelle 202 of FIGS. 3-5 modified to illustrate the example nozzle activation apparatus 204 of FIGS. 7A-7C, 8A and 8B operating at the third example time of the example time-based sequence.

In the illustrated example of FIGS. 7A-7C, the nozzle activation apparatus 204 includes the example controller 218 of FIG. 2. The nozzle activation apparatus 204 of FIGS. 7A-7C further includes the example controllable device(s) 220 of FIG. 2 implemented as an example valve 702 and an example rotatable disk 704 having an example orifice 706. In the illustrated example of FIGS. 7A-7C and 9A-9C, the rotatable disk 904 has a ring-shaped profile, and the orifice 906 of the rotatable disk 904 has an arc-shaped profile. The controller 218 of FIGS. 7A-7C is operatively coupled to the valve 702 and to the rotatable disk 704. An example pressurized fluid source 708 is in fluid communication with the valve 702. The pressurized fluid source 708 produces and/or generates example pressurized fluid 710 that is routed and/or distributed to the valve 702. In some examples, the pressurized fluid source 708 may be implemented as the compressor 214 of the engine 210 of FIG. 2 described above.

As further shown in the example of FIGS. 7A-7C, the valve 702 is in fluid communication with a first example nozzle 712, a second example nozzle 714, and a third example nozzle 716. The rotatable disk 704 of FIGS. 7A-7C and 8A-8C is positioned between the first, second and third nozzles 712, 714, 716 and a rearward-facing stepped aperture (e.g., the rearward-facing stepped aperture 504 of FIG. 5) formed in an inner wall of a nacelle (e.g., the inner wall 306 of the nacelle 202 of FIGS. 3-5). While the example nozzle activation apparatus 204 of FIGS. 7A-7C is illustrated as including a single valve (e.g., the valve 702) in fluid communication with a total of three (3) nozzles (e.g., the first nozzle 712, the second nozzle 714, and the third nozzle 716), the nozzle activation apparatus 204 may include any number of valves in selective fluid communication with any number of nozzles.

The controller 218 of FIGS. 7A-7C actuates (e.g., opens) the valve 702 via one or more control signal(s) transmitted by the controller 218. The controller 218 also actuates (e.g., rotates) the rotatable disk 704 via one or more control signal(s) transmitted by the controller 218. In some examples, the controller 218 transmits the control signal(s) to the valve 702 and the rotatable disk 704 according to a time-based sequence implemented by the controller 218. In some examples, the time-based sequence corresponds to a directional sequence based on the respective locations of the first nozzle 712, the second nozzle 714, and the third nozzle 716 relative to one another. In response to the valve 702 being actuated (e.g., opened), and in further response to the rotatable disk 704 being actuated (e.g., rotated) to selectively align the orifice 706 of the rotatable disk 704 with one of the first nozzle 712, the second nozzle 714, or the third nozzle 716, the orifice 706 of the rotatable disk 704 enables the selectively-aligned one of the first nozzle 712, the second nozzle 714, or the third nozzle 716 to eject a corresponding fluid jet according to the time-based sequence.

For example, as shown in FIG. 7A, the controller 218 actuates (e.g., opens) the valve 702 at the first time (t=t(1)) of the time-based sequence. The controller 218 also actuates (e.g., rotates) the rotatable disk 704 at the first time of the time-based sequence to align the orifice 706 of the rotatable disk 704 with the first nozzle 712. For example, the actuation of the rotatable disk 704 at the first time may cause the rotatable disk 704 to move (e.g., rotate) in an example arcuate direction 802 (e.g., clockwise) until the orifice 706 of the rotatable disk 704 is aligned with the first nozzle 712, as shown in FIGS. 7A and 8A. In response to the actuation of the valve 702, and in further response to the actuation of the rotatable disk 704 to selectively align the orifice 706 of the rotatable disk 704 with the first nozzle 712, the orifice 706 of the rotatable disk 704 enables the first nozzle 712 to eject a first example fluid jet 718. In the illustrated example of FIGS. 7A and 8A, the orifice 706 of the rotatable disk 704 is not aligned with either of the second nozzle 714 or the third nozzle 716. Thus, only the first nozzle 712 from among the illustrated nozzles 712, 714, 716 of FIGS. 7A and 8A ejects a fluid jet at the first time (t=t(1)) of the time-based sequence.

Continuing with the above example, the valve 702 remains actuated (e.g., opened) by the controller 218 at the second time (t=t(2)) of the time-based sequence, as shown in FIG. 7B. The controller 218 also actuates (e.g., rotates) the rotatable disk 704 at the second time of the time-based sequence to align the orifice 706 of the rotatable disk 704 with the second nozzle 714. For example, the actuation of the rotatable disk 704 at the second time may cause the rotatable disk 704 to move (e.g., rotate) in the arcuate direction 802 until the orifice 706 of the rotatable disk 704 is aligned with the second nozzle 714, as shown in FIGS. 7B and 8B. In response to the actuation of the valve 702, and in further response to the actuation of the rotatable disk 704 to selectively align the orifice 706 of the rotatable disk 704 with the second nozzle 714, the orifice 706 of the rotatable disk 704 enables the second nozzle 714 to eject a second example fluid jet 720. In the illustrated example of FIGS. 7B and 8B, the orifice 706 of the rotatable disk 704 is not aligned with either of the first nozzle 712 or the third nozzle 716. Thus, only the second nozzle 714 from among the illustrated nozzles 712, 714, 716 of FIGS. 7B and 8B ejects a fluid jet at the second time (t=t(2)) of the time-based sequence.

Continuing with the above example, the valve 702 remains actuated (e.g., opened) by the controller 218 at the third time (t=t(3)) of the time-based sequence, as shown in FIG. 7C. The controller 218 also actuates (e.g., rotates) the rotatable disk 704 at the third time of the time-based sequence to align the orifice 706 of the rotatable disk 704 with the third nozzle 716. For example, the actuation of the rotatable disk 704 at the third time may cause the rotatable disk 704 to move (e.g., rotate) in the arcuate direction 802 until the orifice 706 of the rotatable disk 704 is aligned with the third nozzle 716, as shown in FIGS. 7C and 8C. In response to the actuation of the valve 702, and in further response to the actuation of the rotatable disk 704 to selectively align the orifice 706 of the rotatable disk 704 with the third nozzle 716, the orifice 706 of the rotatable disk 704 enables the third nozzle 716 to eject a third example fluid jet 722. In the illustrated example of FIGS. 7C and 8C, the orifice 706 of the rotatable disk 704 is not aligned with either of the first nozzle 712 or the second nozzle 714. Thus, only the third nozzle 716 from among the illustrated nozzles 712, 714, 716 of FIGS. 7C and 8C ejects a fluid jet at the second time (t=t(3)) of the time-based sequence.

As demonstrated by the above-described example of FIGS. 7A-7C and 8A-8C, the controller 218 actuates (e.g., opens) the valve 702 and further actuates (e.g., rotates) the rotatable disk 704 to selectively align the orifice 706 with one of the first nozzle 712, the second nozzle 714, or the third nozzle 716 according to the time-based sequence to selectively activate the aligned-one of the first nozzle 712, the second nozzle 714, or the third nozzle 716 according to the time-based sequence.

Figure 9A:
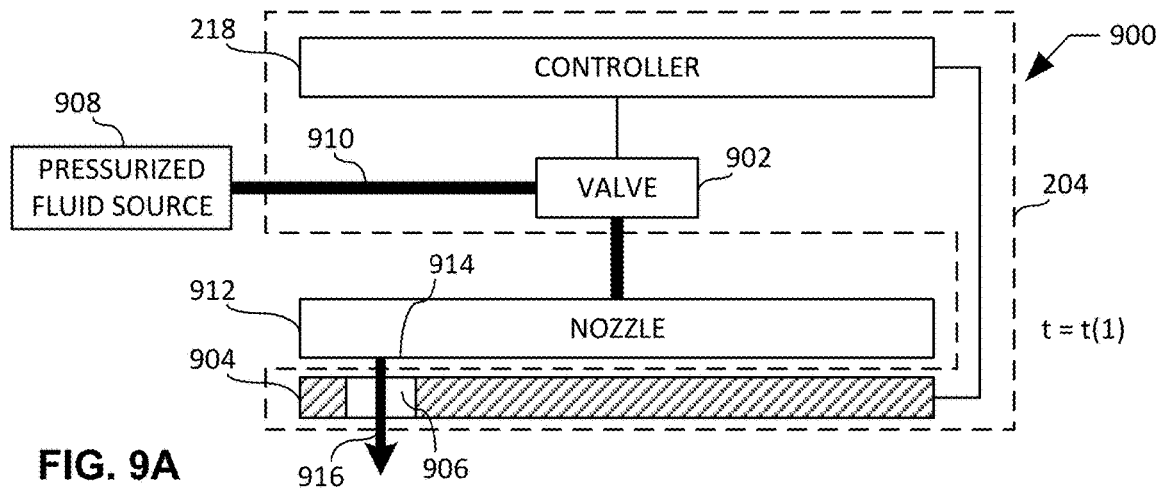
FIG. 9A is a block diagram of a third example implementation of the example nozzle activation apparatus of FIG. 2 operating at a first example time of an example time-based sequence.
Figure 9B:
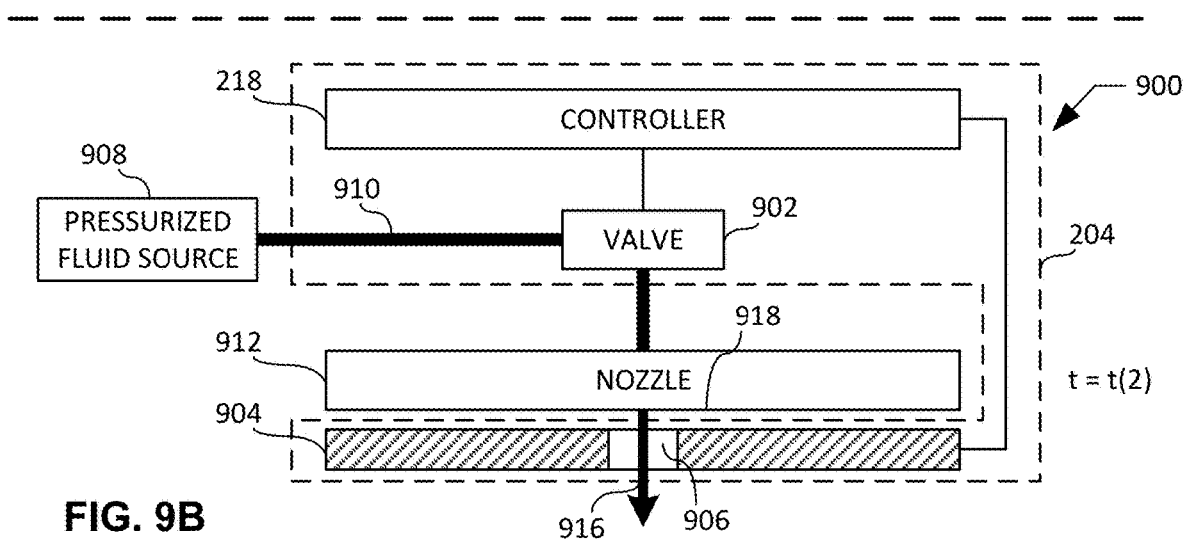
FIG. 9B is a block diagram of the example nozzle activation apparatus of FIG. 9A operating at a second example time of the example time-based sequence.
Figure 9C:
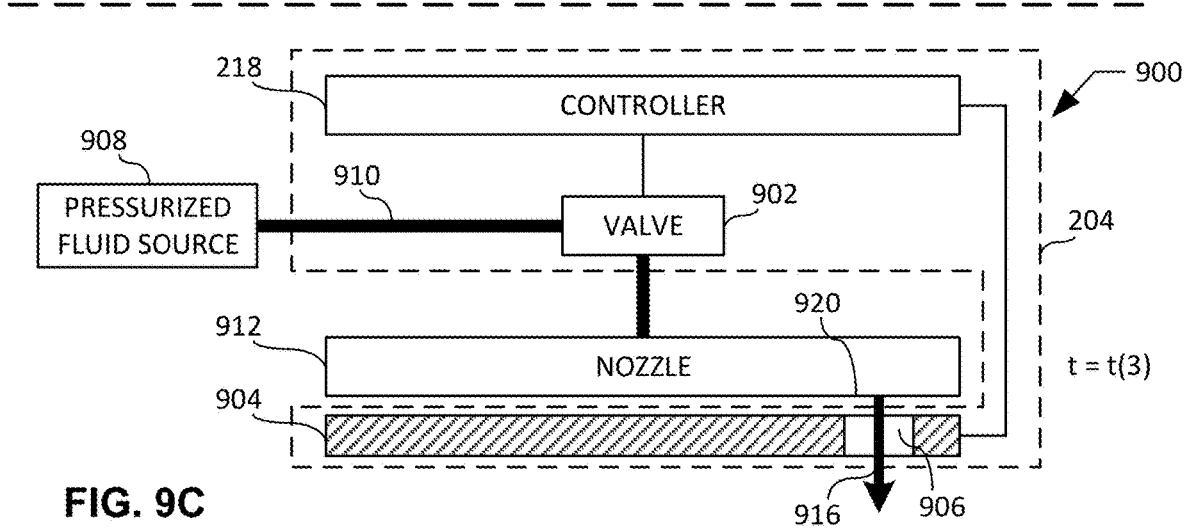
FIG. 9C is a block diagram of the example nozzle activation apparatus of FIGS. 9A and 9B operating at a third example time of the example time-based sequence.
Figure 10A:
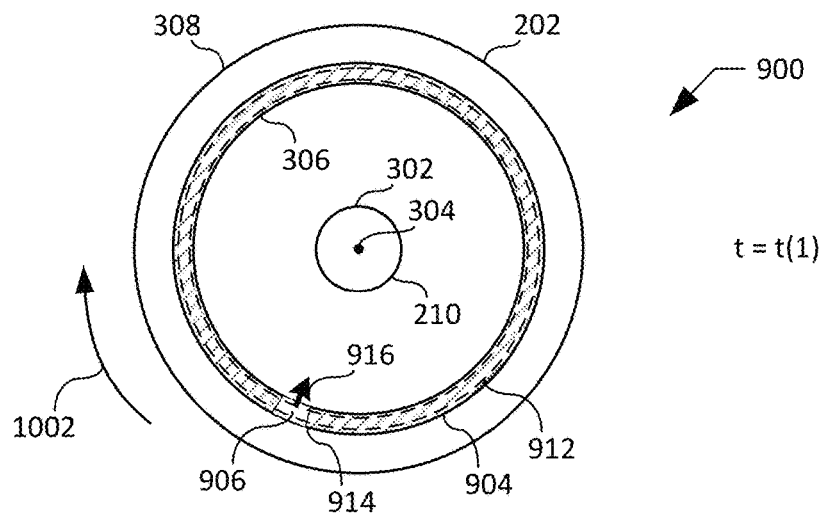
FIG. 10A is a front view of the example nacelle of FIGS. 3-5 modified to illustrate the example nozzle activation apparatus of FIGS. 9A-9C operating at the first example time of the example time-based sequence.
Figure 10B:
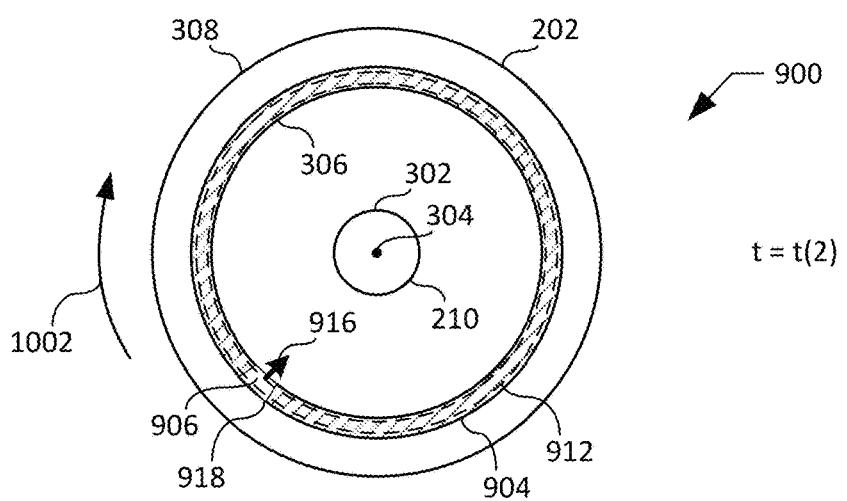
FIG. 10B is a front view of the example nacelle of FIGS. 3-5 modified to illustrate the example nozzle activation apparatus of FIGS. 9A-9C and 10A operating at the second example time of the example time-based sequence.
Figure 10C:
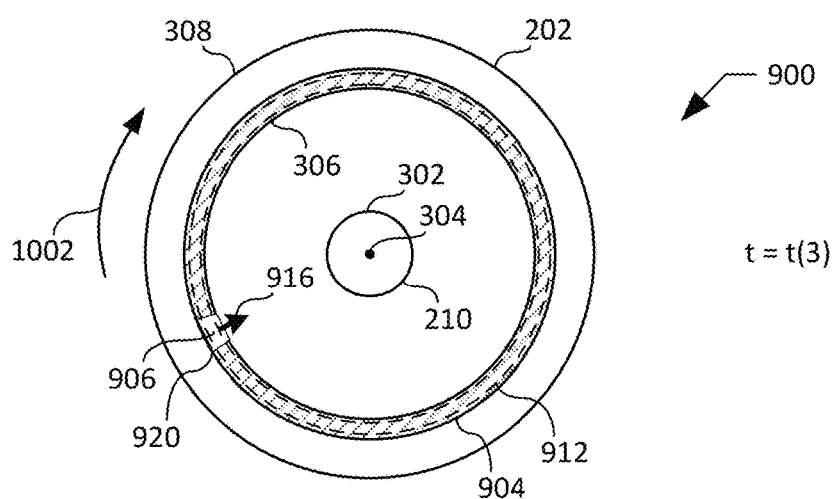
FIG. 10C is a front view of the example nacelle of FIGS. 3-5 modified to illustrate the example nozzle activation apparatus of FIGS. 9A-9C, 10A and 10B operating at the third example time of the example time-based sequence.

FIG. 9A is a block diagram of a third example implementation 900 of the example nozzle activation apparatus 204 of FIG. 2 operating at a first example time (e.g., t=t(1)) of an example time-based sequence. FIG. 9B is a block diagram of the example nozzle activation apparatus 204 of FIG. 9A operating at a second example time (e.g., t=t(2)) of the example time-based sequence. FIG. 9C is a block diagram of the example nozzle activation apparatus 204 of FIGS. 9A and 9B operating at a third example time (e.g., t=t(3)) of the example time-based sequence. FIG. 10A is a front view of the example nacelle 202 of FIGS. 3-5 modified to illustrate the example nozzle activation apparatus 204 of FIGS. 9A-9C operating at the first example time of the example time-based sequence. FIG. 10B is a front view of the example nacelle 202 of FIGS. 3-5 modified to illustrate the example nozzle activation apparatus 204 of FIGS. 9A-9C and 10A operating at the second example time of the example time-based sequence. FIG. 10C is a front view of the example nacelle 202 of FIGS. 3-5 modified to illustrate the example nozzle activation apparatus 204 of FIGS. 9A-9C, 10A and 10B operating at the third example time of the example time-based sequence.

In the illustrated example of FIGS. 9A-9C, the nozzle activation apparatus 204 includes the example controller 218 of FIG. 2. The nozzle activation apparatus 204 of FIGS. 9A-9C further includes the example controllable device(s) 220 of FIG. 2 implemented as an example valve 902 and an example rotatable disk 904 having an example orifice 906. In the illustrated example of FIGS. 9A-9C and 10A-10C, the rotatable disk 904 has a ring-shaped profile, and the orifice 906 of the rotatable disk 904 has an arc-shaped profile. The controller 218 of FIGS. 9A-9C is operatively coupled to the valve 902 and to the rotatable disk 904. An example pressurized fluid source 908 is in fluid communication with the valve 902. The pressurized fluid source 908 produces and/or generates example pressurized fluid 910 that is routed and/or distributed to the valve 902. In some examples, the pressurized fluid source 908 may be implemented as the compressor 214 of the engine 210 of FIG. 2 described above.

As further shown in the example of FIGS. 9A-9C, the valve 902 is in fluid communication with an example nozzle 912. The nozzle 912 of FIGS. 9A-9C and 10A-10C extends circumferentially about an inner wall of a nacelle (e.g., the inner wall 306 of the nacelle 202 of FIGS. 3-5) such that the nozzle 912 has a generally ring-shaped profile, as shown in FIGS. 10A-10C. The rotatable disk 904 of FIGS. 9A-9C and 10A-10C is positioned between the nozzle 912 and a rearward-facing stepped aperture (e.g., the rearward-facing stepped aperture 504 of FIG. 5) formed in an inner wall of a nacelle (e.g., the inner wall 306 of the nacelle 202 of FIGS. 3-5). While the example nozzle activation apparatus 204 of FIGS. 9A-9C is illustrated as including a single valve (e.g., the valve 702) in fluid communication with the nozzle 912, the nozzle activation apparatus 204 may include any number of valves in fluid communication with the nozzle 912.

The controller 218 of FIGS. 9A-9C actuates (e.g., opens) the valve 902 via one or more control signal(s) transmitted by the controller 218. The controller 218 also actuates (e.g., rotates) the rotatable disk 904 via one or more control signal(s) transmitted by the controller 218. In some examples, the controller 218 transmits the control signal(s) to the valve 902 and the rotatable disk 904 according to a time-based sequence implemented by the controller 218. In some examples, the time-based sequence corresponds to a directional sequence relative to a circumference of the nozzle 912 (e.g., clockwise around the circumference of the nozzle 912). In response to the valve 902 being actuated (e.g., opened), and in further response to the rotatable disk 904 being actuated (e.g., rotated) to move the orifice 906 of the rotatable disk 904 relative to the nozzle 912, the orifice 906 of the rotatable disk 904 enables the nozzle 912 to eject a fluid jet through the orifice 906 at corresponding locations of the orifice 906 according to the time-based sequence.

For example, as shown in FIG. 9A, the controller 218 actuates (e.g., opens) the valve 902 at the first time (t=t(1)) of the time-based sequence. The controller 218 also actuates (e.g., rotates) the rotatable disk 904 at the first time of the time-based sequence to move the orifice 906 of the rotatable disk 904 to a first example location 914 relative to the nozzle 912. For example, the actuation of the rotatable disk 904 at the first time may cause the rotatable disk 904 to move (e.g., rotate) in an example arcuate direction 1002 (e.g., clockwise) until the orifice 906 of the rotatable disk 904 is positioned at the first location 914, as shown in FIGS. 9A and 10A. In response to the actuation of the valve 902, and in further response to the actuation of the rotatable disk 904 to move the orifice 906 of the rotatable disk 904 to the first location 914, the orifice 906 of the rotatable disk 904 enables the nozzle 912 to eject an example fluid jet 916 through the orifice 906 at the first location 914 according to the time-based sequence.

Continuing with the above example, the valve 902 remains actuated (e.g., opened) by the controller 218 at the second time (t=t(2)) of the time-based sequence, as shown in FIG. 9B. The controller 218 also actuates (e.g., rotates) the rotatable disk 904 at the second time of the time-based sequence to move the orifice 906 of the rotatable disk 904 to a second example location 918 relative to the nozzle 912. For example, the actuation of the rotatable disk 904 at the second time may cause the rotatable disk 904 to move (e.g., rotate) in the arcuate direction 1002 (e.g., clockwise) until the orifice 906 of the rotatable disk 904 is positioned at the second location 918, as shown in FIGS. 9B and 10B. In response to the actuation of the valve 902, and in further response to the actuation of the rotatable disk 904 to move the orifice 906 of the rotatable disk 904 to the second location 918, the orifice 906 of the rotatable disk 904 enables the nozzle 912 to eject the fluid jet 916 through the orifice 906 at the second location 918 according to the time-based sequence.

Continuing with the above example, the valve 902 remains actuated (e.g., opened) by the controller 218 at the third time (t=t(3)) of the time-based sequence, as shown in FIG. 9C. The controller 218 also actuates (e.g., rotates) the rotatable disk 904 at the third time of the time-based sequence to move the orifice 906 of the rotatable disk 904 to a third example location 920 relative to the nozzle 912. For example, the actuation of the rotatable disk 904 at the third time may cause the rotatable disk 904 to move (e.g., rotate) in the arcuate direction 1002 (e.g., clockwise) until the orifice 906 of the rotatable disk 904 is positioned at the third location 920, as shown in FIGS. 9C and 10C. In response to the actuation of the valve 902, and in further response to the actuation of the rotatable disk 904 to move the orifice 906 of the rotatable disk 904 to the third location 920, the orifice 906 of the rotatable disk 904 enables the nozzle 912 to eject the fluid jet 916 through the orifice 906 at the third location 920 according to the time-based sequence.

As demonstrated by the above-described example of FIGS. 9A-9C and 10A-10C, the controller 218 actuates (e.g., opens) the valve 902 and further actuates (e.g., rotates) the rotatable disk 904 in the arcuate direction 1002 (e.g., clockwise) to enable the nozzle 912 to eject a fluid jet through the orifice 906 at respective ones of the illustrated locations 914, 918, 920 according to the time-based sequence. The first, second and third locations 914, 918, 920 of the illustrated example of FIGS. 9A-9C and 10A-10C are merely example locations. It is to be understood from the above-described example of FIGS. 9A-9C and 10A-10C that the fluid jet 916 is continuously ejected from the nozzle 912 through the orifice 906 of the rotatable disk 904 at each successive location of the orifice 906 relative to the circumference of the nozzle 912, as dictated by a time-based sequence and a directional sequence implemented via the controller 218.

In other examples, the rotatable disk 904 of FIGS. 9A-9C and 10A-10C may include a set of orifices (e.g., a plurality of spaced apart, radially-adjacent orifices including the orifice 906 of FIGS. 9A-9C and 10A-10C) arranged about a portion of a circumference of the rotatable disk 904. In such examples, in response to the controller 218 actuating (e.g., rotating) the rotatable disk 904 to move the set of orifices of the rotatable disk 904 relative to the nozzle 912, respective ones of the orifices enable the nozzle 912 to eject corresponding respective fluid jets through the respective ones of the orifices at corresponding locations of the respective ones of the orifices according to the time-based sequence implemented by the controller 218.

FIG. 11A is a perspective view of the example nacelle 202 of FIGS. 3-5 illustrating a first example flow separation pattern 1102 occurring when the example nozzle activation apparatus 204 of the example flow distortion reduction apparatus 200 of FIG. 2 is not in operation. The illustrated flow separation pattern 1102 of FIG. 11A occurs in response to flight conditions including an inlet mass flow of approximately one thousand pounds per second and a crosswind flow in an example crosswind direction 1104 of approximately thirty knots. Such flight conditions may be experienced by the nacelle during a takeoff operation of an aircraft to which the nacelle is coupled. In response to these flight conditions, the crosswind flow turns sharply around the inlet of the nacelle at the windward side, creating an adverse pressure gradient within the inlet of the nacelle. The illustrated flow separation pattern 1102 ensues within the inlet of the nacelle and spreads in a downstream direction, as shown in FIG. 11A.

FIG. 11B is a perspective view of the example nacelle 202 of FIGS. 3-5 and 11A illustrating a first example instantaneous flow separation pattern 1106 occurring when the example nozzle activation apparatus 204 of the example flow distortion reduction apparatus 200 of FIG. 2 is operating at a first example time (e.g., t=t(1)) of an example time-based sequence obtained in a limit cycle. The instantaneous flow separation pattern 1106 of FIG. 11B occurs at the first time in response to a time-based actuation sequence and a directional actuation sequence (e.g., a directional sequence that moves in the arcuate direction 320 of FIGS. 3 and 4) of the nozzle activation apparatus 204.

FIG. 11C is a perspective view of the example nacelle 202 of FIGS. 3-5, 11A and 11B illustrating a second example instantaneous flow separation pattern 1108 occurring when the example nozzle activation apparatus 204 of the example flow distortion reduction apparatus 200 of FIG. 2 is operating at a second example time (e.g., t=t(2)) of the example time-based sequence obtained in the limit cycle. The instantaneous flow separation pattern 1108 of FIG. 11C occurs at the second time in response to the time-based sequence and the directional sequence of the nozzle activation apparatus 204.

FIG. 11D is a perspective view of the example nacelle 202 of FIGS. 3-5 and 11A-11C illustrating a third example instantaneous flow separation pattern 1110 occurring when the example nozzle activation apparatus 204 of the example flow distortion reduction apparatus 200 of FIG. 2 is operating at a third example time (t=t(3)) of the example time-based sequence obtained in the limit cycle. The instantaneous flow separation pattern 1110 of FIG. 11D occurs at the third time in response to the time-based sequence and the directional sequence of the nozzle activation apparatus 204.

As shown in the illustrated example of FIGS. 11A-11D, the operation of the nozzle activation apparatus 204 of the flow distortion reduction apparatus 200 reduces the extent, degree, and/or amount of separated flow occurring within the nacelle 202. For example, each of the first instantaneous flow separation pattern 1106 of FIG. 11B, the second instantaneous flow separation pattern 1108 of FIG. 11C, and the third instantaneous flow separation pattern 1110 of FIG. 11D associated with the operation of the nozzle activation apparatus 204 is of an extent, degree, and/or amount that is reduced relative to the extent, degree, and/or amount of the first flow separation pattern 1102 of FIG. 11A associated with the nozzle activation apparatus 204 not being in operation. The illustrated reduction in separated flow resulting from operation of the nozzle activation apparatus 204 corresponds to a reduction in flow distortion within the nacelle 202 resulting from operation of the nozzle activation apparatus 204.

Figure 12A:
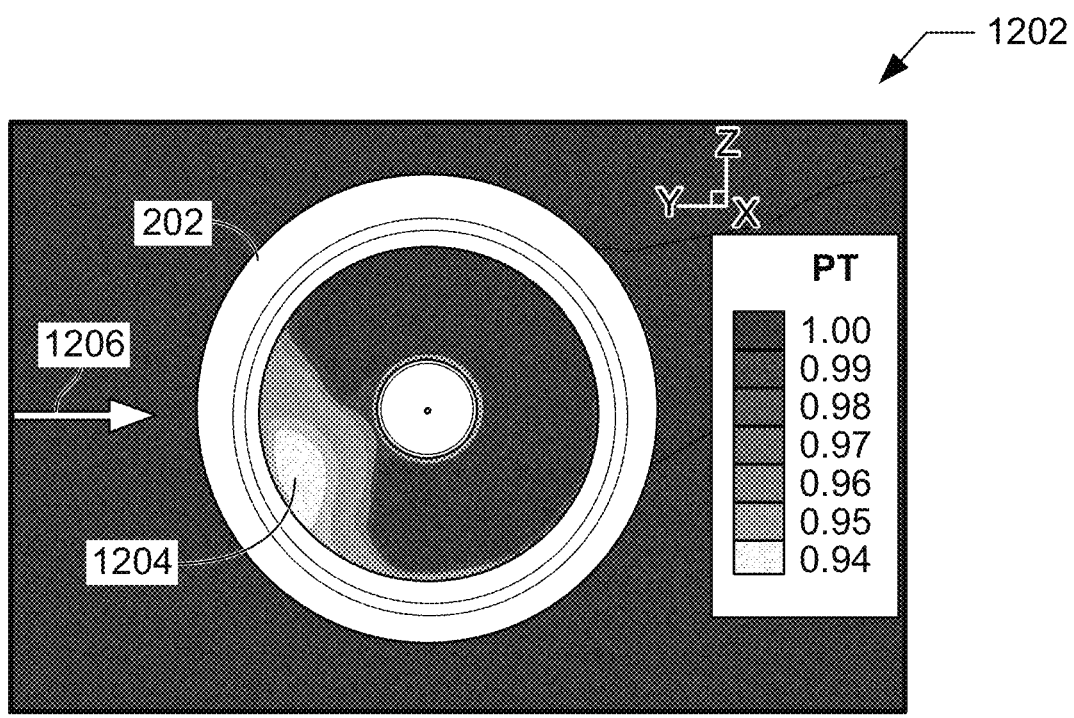
FIG. 12A is a first example pressure recovery map illustrating example pressure loss occurring at an engine fan of a nacelle during example flight conditions in the absence of the example flow distortion reduction apparatus of FIG. 2.

FIG. 12A is a first example pressure recovery map 1202 illustrating example pressure loss 1204 occurring at an engine fan of a nacelle (e.g., the engine fan 212 of the engine 210 of the nacelle 202 of FIG. 2) during example flight conditions in the absence of the example flow distortion reduction apparatus 200 of FIG. 2. In the illustrated example of FIG. 12A, the example flight conditions include an inlet mass flow of approximately one thousand pounds per second and a crosswind flow in an example crosswind direction 1206 of approximately thirty knots. Such flight conditions may be experienced by the nacelle during a takeoff operation of an aircraft to which the nacelle is coupled. In response to these flight conditions, the crosswind flow turns sharply around the inlet of the nacelle at the windward side, creating an adverse pressure gradient within the inlet of the nacelle. Flow separation ensues within the inlet of the nacelle in a downstream direction toward the engine fan. The first pressure recovery map 1202 of FIG. 12A indicates significant pressure loss (e.g., poor pressure recovery) at the engine fan of the nacelle.

Figure 12B:
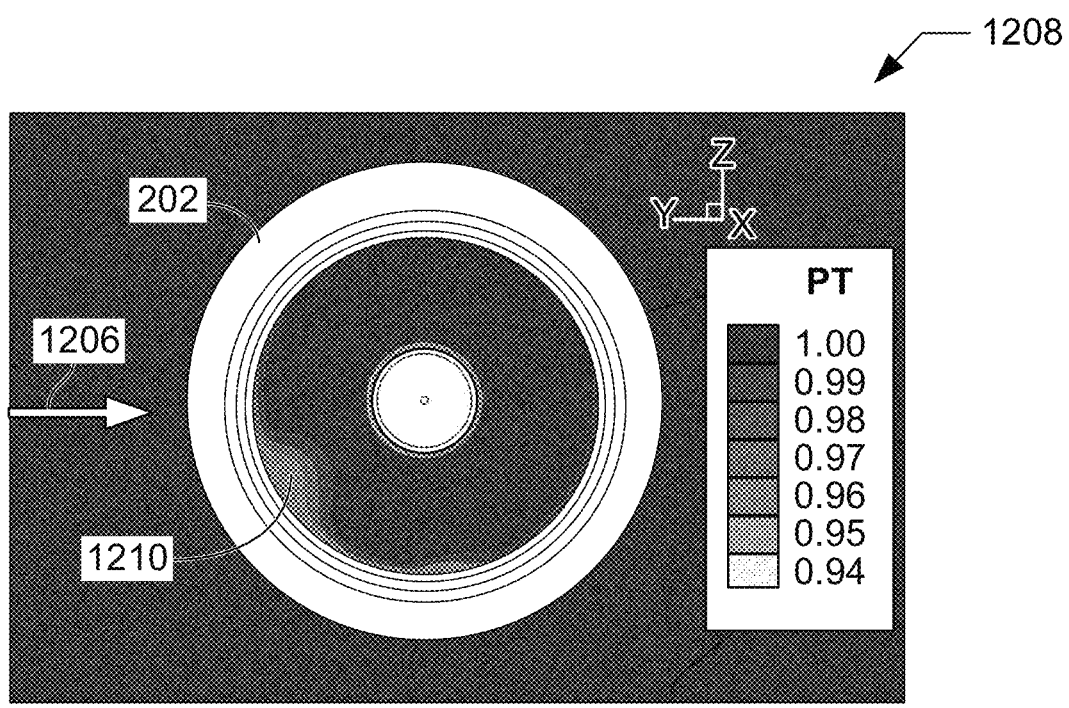
FIG. 12B is a second example pressure recovery map illustrating example time-averaged pressure loss occurring at the engine fan of the nacelle of FIG. 12A as a result of implementing the example flow distortion reduction apparatus of FIG. 2.

FIG. 12B is a second example pressure recovery map 1208 illustrating example time-averaged pressure loss 1210 occurring at the engine fan of the nacelle of FIG. 12A as a result of implementing the example flow distortion reduction apparatus 200 of FIG. 2. The flight conditions associated with the second pressure recovery map 1208 of FIG. 12B are the same as the flight conditions associated with the first pressure recovery map 1202 of FIG. 12A described above. The pressure loss 1210 at the engine fan of the nacelle as shown in the second pressure recovery map 1208 of FIG. 12B indicates a significant reduction in the extent, degree, and/or amount of lost pressure relative to the pressure loss 1204 shown in the first pressure recovery map 1202 of FIG. 12A described above. Thus, the implementation of the flow distortion reduction apparatus 200 of FIG. 2 reduces the extent, degree, and/or amount of pressure loss (e.g., improves the pressure recovery) occurring at the engine fan of the nacelle in relation to the above-described flight conditions.

Figure 13A:
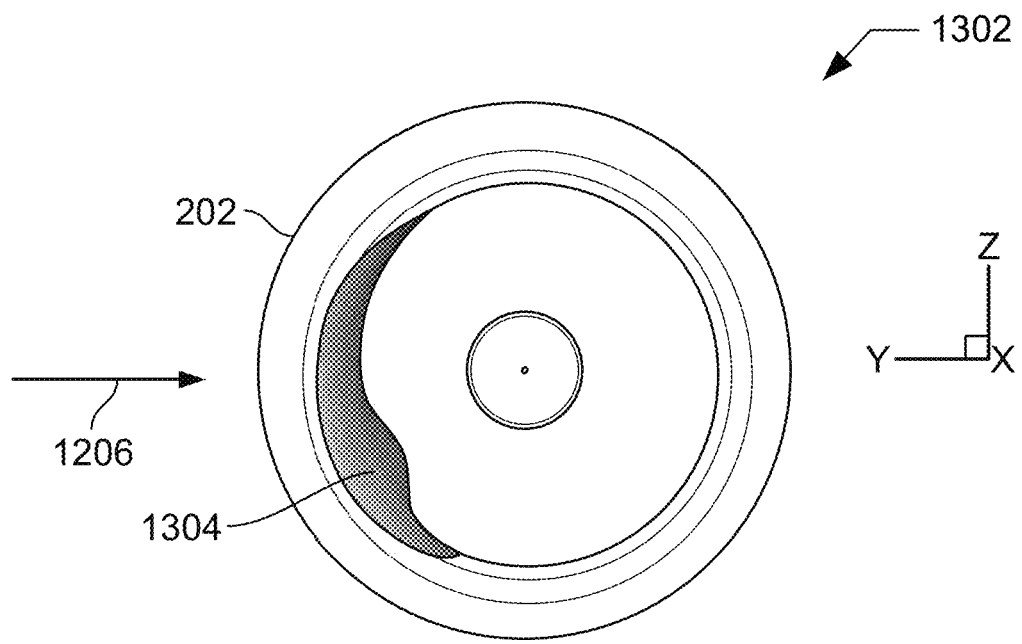
FIG. 13A is a first example separated flow map illustrating example separated flow occurring at an inlet of a nacelle during example flight conditions in the absence of the example flow distortion reduction apparatus of FIG. 2.

FIG. 13A is a first example separated flow map 1302 illustrating example separated flow 1304 occurring at an inlet of a nacelle (e.g., the nacelle 202 of FIG. 2) during example flight conditions in the absence of the example flow distortion reduction apparatus 200 of FIG. 2. The flight conditions associated with the first separated flow map 1302 of FIG. 13A are the same as the flight conditions associated with the first pressure recovery map 1202 of FIG. 12A described above. The first separated flow map 1302 of FIG. 13A indicates significant separated flow at the inlet of the nacelle.

Figure 13B:
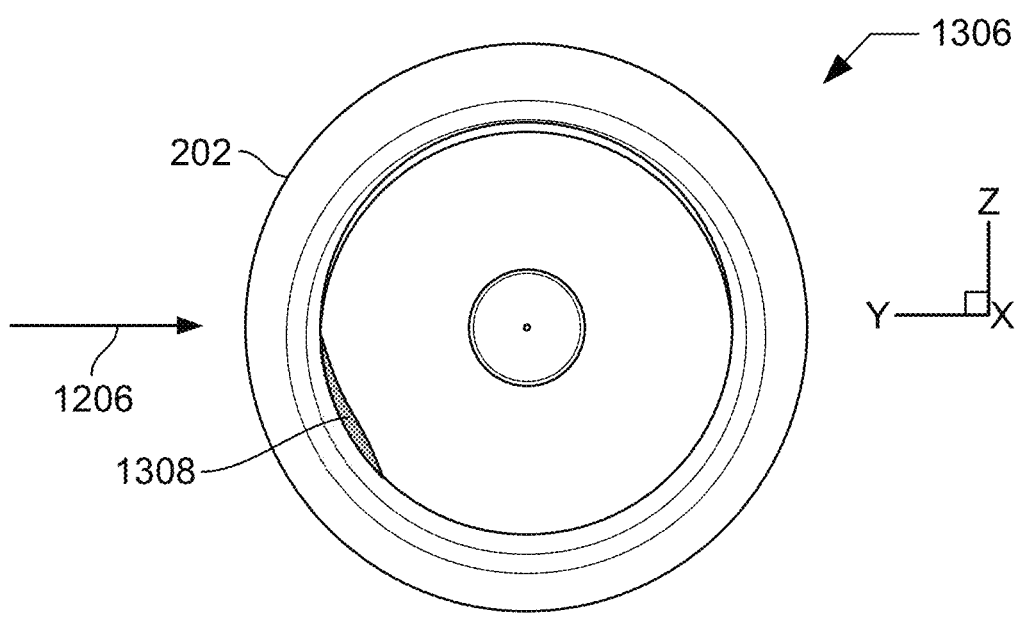
FIG. 13B is a second example separated flow map illustrating example time-averaged separated flow occurring at the inlet of the nacelle of FIG. 13A as a result of implementing the example flow distortion reduction apparatus of FIG. 2.

FIG. 13B is a second example separated flow map 1306 illustrating example time-averaged separated flow 1308 occurring at the inlet of the nacelle of FIG. 13A as a result of implementing the example flow distortion reduction apparatus 200 of FIG. 2. The flight conditions associated with the second separated flow map 1306 of FIG. 13B are the same as the flight conditions associated with the first separated flow map 1302 of FIG. 13A described above. The separated flow 1308 at the inlet of the nacelle as shown in the second separated flow map 1306 of FIG. 13B indicates a significant reduction in the extent, degree, and/or amount of flow separation relative to the separated flow 1304 shown in the first separated flow map 1302 of FIG. 13A described above. Thus, the implementation of the flow distortion reduction apparatus 200 of FIG. 2 reduces the extent, degree, and/or amount of separated flow occurring at the inlet of the nacelle in relation to the above-described flight conditions.

Figure 14A:
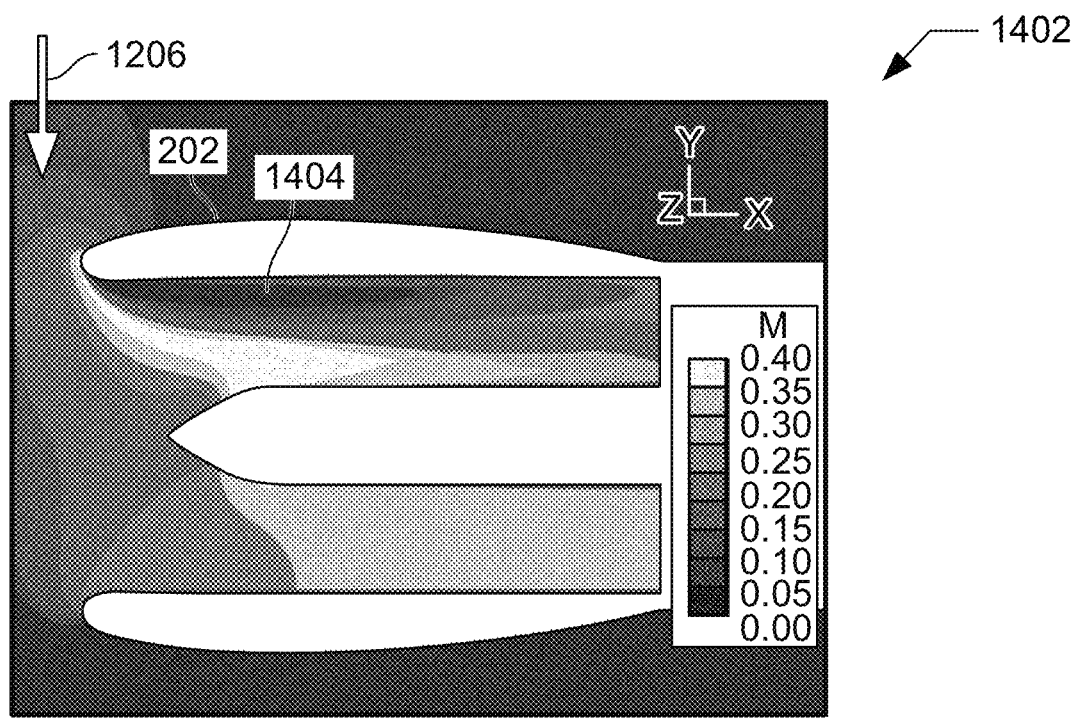
FIG. 14A is a first example flow distortion map illustrating example flow distortion occurring at an engine fan of a nacelle during example flight conditions in the absence of the example flow distortion reduction apparatus of FIG. 2.

FIG. 14A is a first example flow distortion map 1402 on a horizontal cut through an engine of a nacelle illustrating example flow distortion 1404 occurring at an engine fan of the nacelle (e.g., the engine fan 212 of the engine 210 of the nacelle 202 of FIG. 2) during example flight conditions in the absence of the example flow distortion reduction apparatus 200 of FIG. 2. The flight conditions associated with the first flow distortion map 1402 of FIG. 14A are the same as the flight conditions associated with the first pressure recovery map 1202 of FIG. 12A described above. The first flow distortion map 1402 of FIG. 14A indicates significant flow distortion at the engine fan of the nacelle.

Figure 14B:
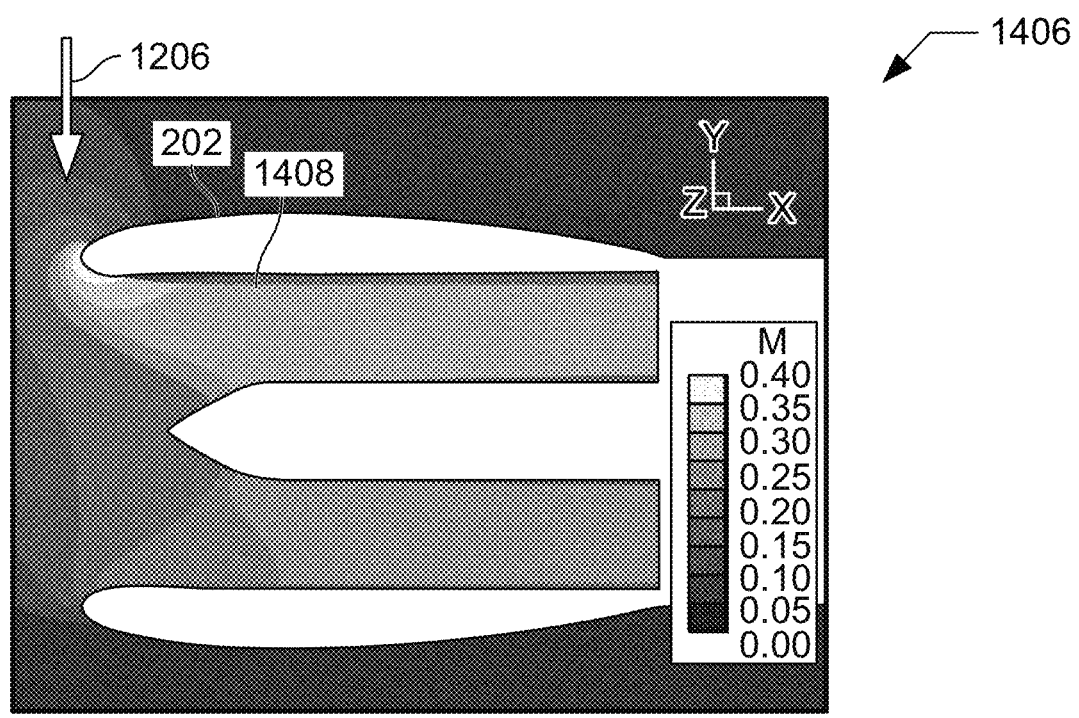
FIG. 14B is a second example flow distortion map illustrating example time-averaged flow distortion occurring at the engine fan of the nacelle of FIG. 14A as a result of implementing the example flow distortion reduction apparatus of FIG. 2.

FIG. 14B is a second example flow distortion map 1206 illustrating example time-averaged flow distortion 1408 occurring at the engine fan of the nacelle of FIG. 14A as a result of implementing the example flow distortion reduction apparatus 200 of FIG. 2. The flight conditions associated with the second flow distortion map 1406 of FIG. 14B are the same as the flight conditions associated with the first flow distortion map 1402 of FIG. 14A described above. The flow distortion 1408 at the engine fan of the nacelle as shown in the second flow distortion map 1406 of FIG. 14B indicates a significant reduction in the extent, degree, and/or amount of flow distortion relative to the flow distortion 1404 shown in the first flow distortion map 1402 of FIG. 14A described above. Thus, the implementation of the flow distortion reduction apparatus 200 of FIG. 2 reduces the extent, degree, and/or amount of flow distortion occurring at the engine fan of the nacelle in relation to the above-described flight conditions.

Figure 15:
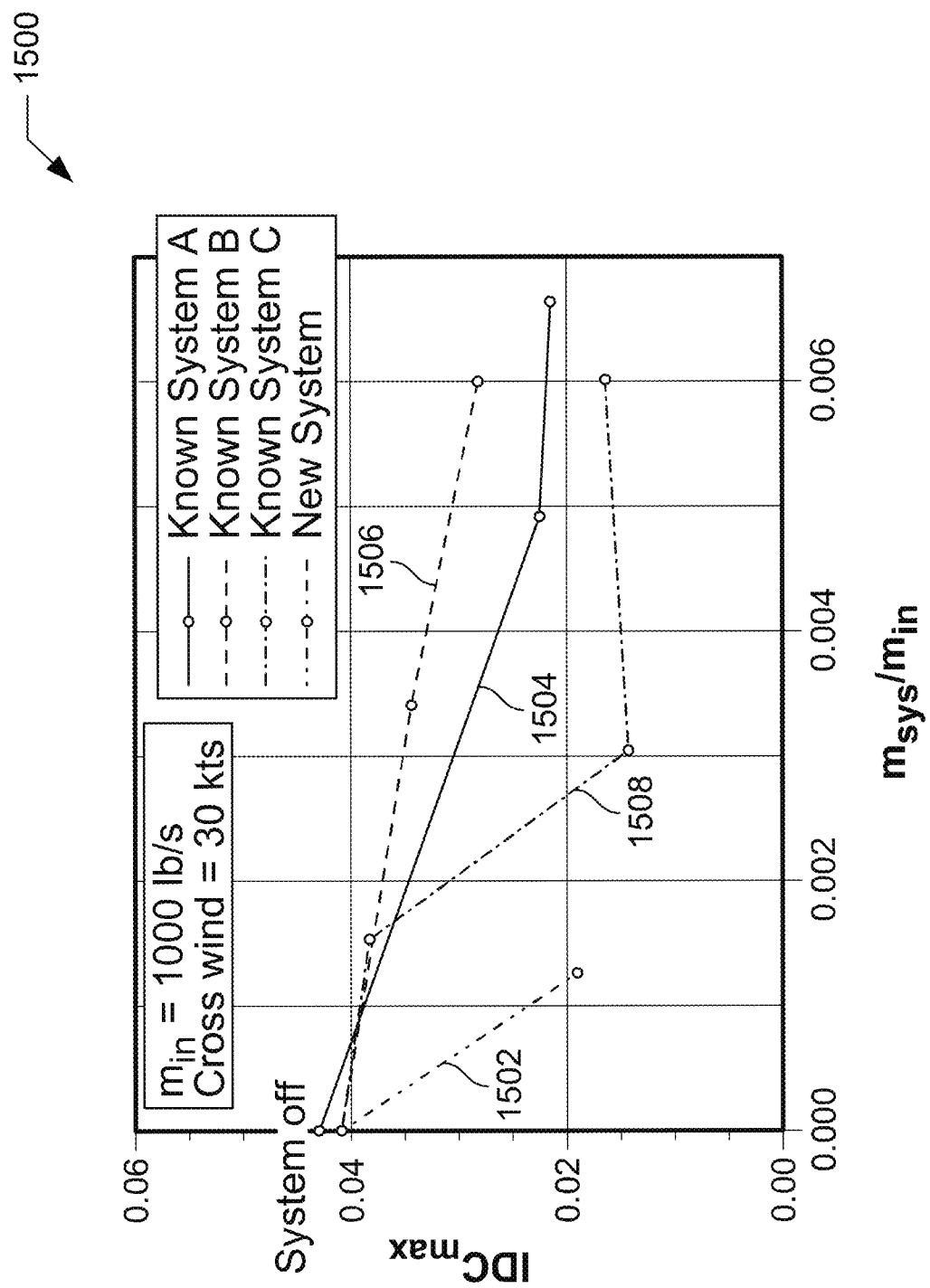
FIG. 15 is an example graph of flow distortion versus actuation mass flow (expressed as a fraction of engine mass flow) illustrating an example plot of flow distortion occurring at an engine fan of a nacelle as a result of implementing the example flow distortion reduction apparatus of FIG. 2.

FIG. 15 is an example graph 1500 of flow distortion versus actuation mass flow (expressed as a fraction of engine mass flow) illustrating a first example plot 1502 of flow distortion occurring at an engine fan of a nacelle (e.g., the engine fan 212 of the engine 210 of the nacelle 202 of FIG. 2) as a result of implementing the example flow distortion reduction apparatus 200 of FIG. 2. The graph 1500 of FIG. 15 also illustrates a second example plot 1504 of flow distortion, a third example plot 1506 of flow distortion, and a fourth example plot 1508 of flow distortion respectively occurring at the engine fan of the nacelle as a result of implementing respective ones of a first known flow distortion reduction apparatus, a second known flow distortion reduction apparatus, and a third known flow distortion reduction apparatus.

As shown in the graph 1500 of FIG. 15, implementation of the flow distortion reduction apparatus 200 of FIG. 2 represented by the first plot 1502 provides for an increased reduction in flow distortion relative to respective flow distortion reductions provided by each of the known flow distortion reduction apparatus represented by the second plot 1504, the third plot 1506, and the fourth plot 1508. For example, as shown in FIG. 15, the flow distortion reduction apparatus 200 of FIG. 2 represented by the first plot 1502 is able to achieve a reduced flow distortion of about 0.02 at a mass flow value that is approximately fifty percent of the mass flow value at which the third known flow distortion reduction apparatus represented by the fourth plot 1508 is able to achieve a reduced flow distortion of about 0.02.

Figure 16:
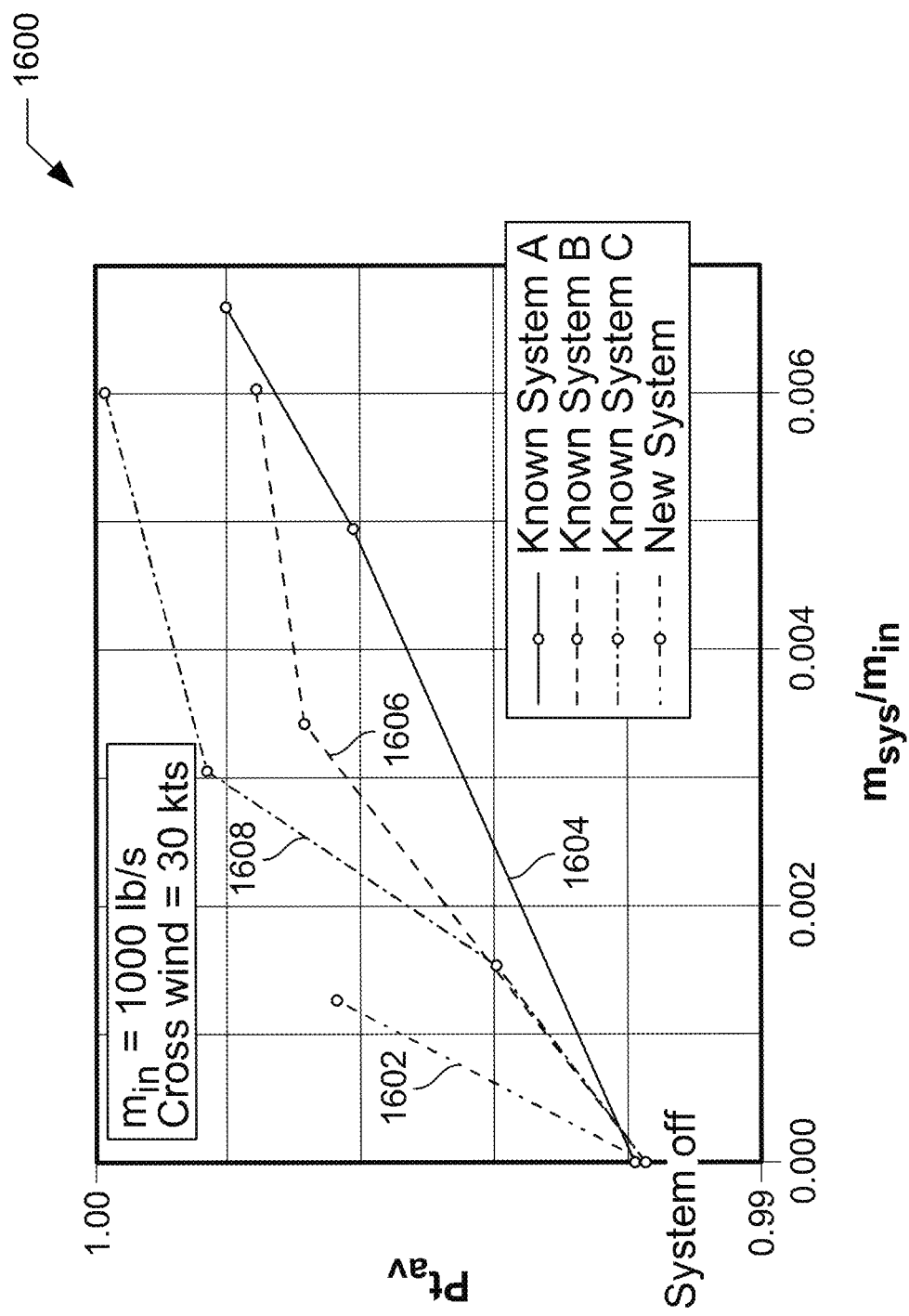
FIG. 16 is an example graph of pressure recovery versus actuation mass flow (expressed as a fraction of engine mass flow) illustrating an example plot of pressure loss occurring at an engine fan of a nacelle as a result of implementing the example flow distortion reduction apparatus of FIG. 2.

FIG. 16 is an example graph 1600 of pressure recovery versus actuation mass flow (expressed as a fraction of engine mass flow) illustrating an example plot 1602 of pressure loss occurring at an engine fan of a nacelle (e.g., the engine fan 212 of the engine 210 of the nacelle 202 of FIG. 2) as a result of implementing the example flow distortion reduction apparatus 200 of FIG. 2. The graph 1600 of FIG. 16 also illustrates a second example plot 1604 of pressure loss, a third example plot 1606 of pressure loss, and a fourth example plot 1608 of pressure loss respectively occurring at the engine fan of the nacelle as a result of implementing respective ones of a first known flow distortion reduction apparatus, a second known flow distortion reduction apparatus, and a third known flow distortion reduction apparatus.

As shown in the graph 1600 of FIG. 16, implementation of the flow distortion reduction apparatus 200 of FIG. 2 represented by the first plot 1602 provides for an increased reduction in pressure loss (e.g., improved pressure recovery) relative to respective pressure loss reductions provided by each of the known flow distortion reduction apparatus represented by the second plot 1604, the third plot 1606, and the fourth plot 1608. For example, as shown in FIG. 16, the flow distortion reduction apparatus 200 of FIG. 2 represented by the first plot 1602 is able to achieve a pressure recovery of about 0.996 at a mass flow value that is approximately fifty percent of the mass flow value at which the third known flow distortion reduction apparatus represented by the fourth plot 1608 is able to achieve a pressure recovery of about 0.996.

While example manners of implementing the nozzle activation apparatus 204 and/or, more generally, the flow distortion reduction apparatus 200 of FIG. 2 are illustrated in FIGS. 2-5, 6A-6C, 7A-7C, 8A-8C, 9A-9C, 10A-10C, 11A-11D, 12A, 12B, 13A, 13B, 14A, 14B, 15 and 16, one or more of the elements, processes and/or devices illustrated in FIGS. 2-5, 6A-6C, 7A-7C, 8A-8C, 9A-9C, 10A-10C, 11A-11D, 12A, 12B, 13A, 13B, 14A, 14B, 15 and 16 may be combined, divided, re-arranged, omitted, eliminated and/or implemented in any other way. Further, the example controller 218, the example controllable device(s) 220, the example memory 222 and/or, more generally, the example nozzle activation apparatus 204 of FIGS. 2, 6A-6C, 7A-7C, and 9A-9C may be implemented by hardware, software, firmware and/or any combination of hardware, software and/or firmware. Thus, for example, any of the example controller 218, the example controllable device(s) 220, the example memory 222 and/or, more generally, the example nozzle activation apparatus 204 of FIGS. 2, 6A-6C, 7A-7C, and 9A-9C could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example controller 218, the example controllable device(s) 220, the example memory 222 and/or, more generally, the example nozzle activation apparatus 204 of FIGS. 2, 6A-6C, 7A-7C, and 9A-9C is/are hereby expressly defined to include a non-transitory computer readable storage device or storage disk such as a memory, a digital versatile disk (DVD), a compact disk (CD), a Blu-ray disk, etc. including the software and/or firmware. Further still, the example nozzle activation apparatus 204 and/or, more generally, the example flow distortion reduction apparatus 200 of FIGS. 2-5, 6A-6C, 7A-7C, 8A-8C, 9A-9C, 10A-10C, 11A-11D, 12A, 12B, 13A, 13B, 14A, 14B, 15 and 16 may include one or more elements, processes and/or devices in addition to, or instead of, those illustrated in FIGS. 2-5, 6A-6C, 7A-7C, 8A-8C, 9A-9C, 10A-10C, 11A-11D, 12A, 12B, 13A, 13B, 14A, 14B, 15 and 16, and/or may include more than one of any or all of the illustrated elements, processes and devices.

Flowcharts representative of example machine readable instructions for implementing the example nozzle activation apparatus 204 and/or, more generally, the example flow distortion reduction apparatus 200 of FIG. 2 are shown in FIGS. 17-20. In these examples, the machine readable instructions comprise one or more program(s) for execution by one or more processor(s) such as the processor 2102 shown in the example processor platform 2100 discussed below in connection with FIG. 21. Each program may be embodied in software stored on a non-transitory computer readable storage medium such as a CD-ROM, a floppy disk, a hard drive, a digital versatile disk (DVD), a Blu-ray disk, or a memory associated with the processor 2102, but the entirety of any program and/or parts thereof could alternatively be executed by a device other than the processor 2102 and/or embodied in firmware or dedicated hardware. Further, although the example program(s) is/are described with reference to the flowcharts illustrated in FIGS. 17-20, many other methods of implementing the example nozzle activation apparatus 204 and/or, more generally, the example flow distortion reduction apparatus 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 17-20 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 17:
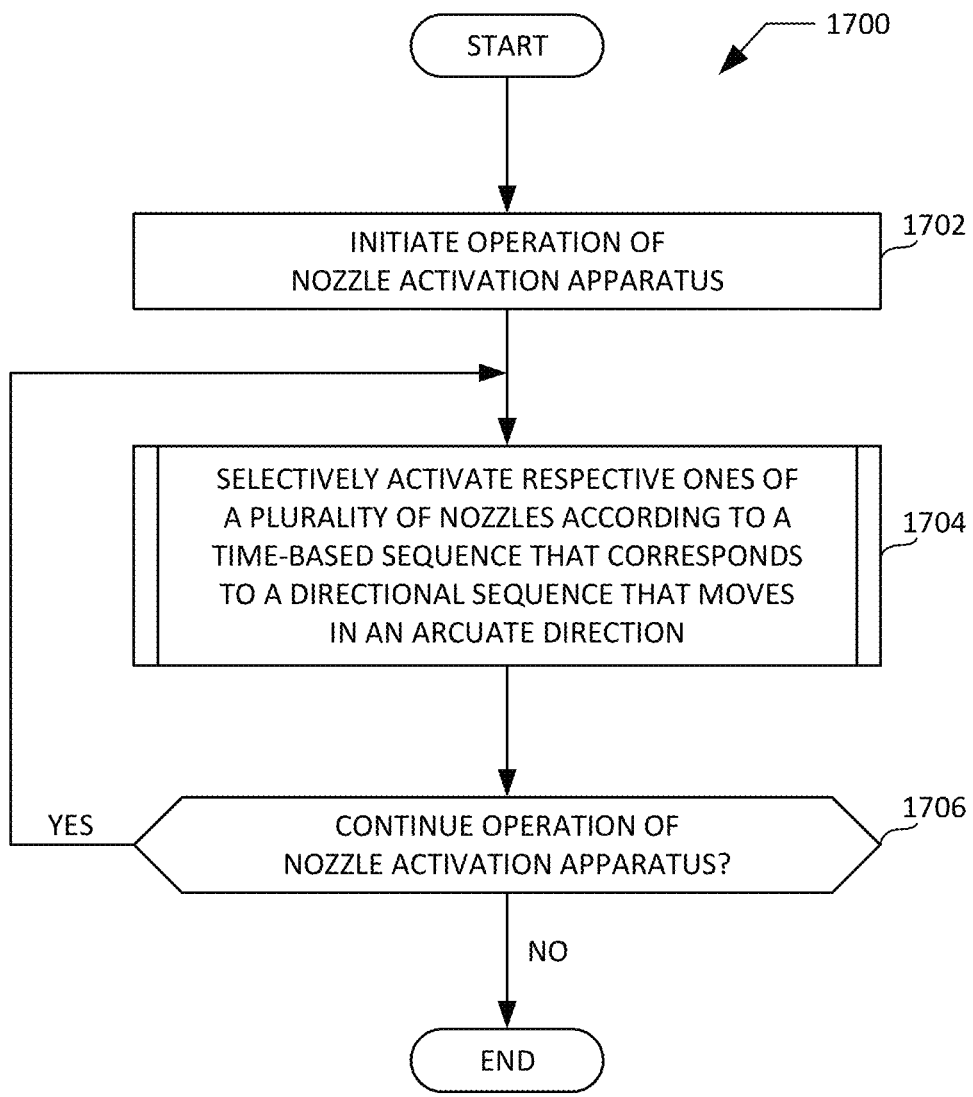
FIG. 17 is a flowchart representative of an example method that may be executed at the example nozzle activation apparatus of the example flow distortion reduction apparatus of FIG. 2 to reduce flow distortion at an engine fan of a nacelle.

FIG. 17 is a flowchart representative of an example method 1700 that may be executed at the example nozzle activation apparatus 204 of the example flow distortion reduction apparatus 200 of FIG. 2 to reduce flow distortion at an engine fan of a nacelle (e.g., the example engine fan 212 of the example engine 210 of the example nacelle 202 of FIG. 2). The example method 1700 begins when the example controller 218 of FIG. 2 initiates operation of the example nozzle activation apparatus 204 of FIG. 2 (block 1702). For example, the controller 218 may receive one or more input control signal(s) via one or more input device(s) of a user interface operatively coupled to the controller 218 indicating that the controller 218 is to activate and/or initiate operation of the nozzle activation apparatus 204. In some examples, the controller 218 may initiate operation of the nozzle activation apparatus 204 during takeoff or landing of an aircraft including the nozzle activation apparatus 204. Following block 1702, control of the example method 1700 of FIG. 17 proceeds to block 1704.

At block 1704, the example controller 218 of FIG. 2 selectively activates respective ones of a plurality of nozzles (e.g., respective ones of the example nozzles 208 of FIGS. 2-4) according to a time-based sequence corresponding to a directional sequence that moves in an arcuate direction (e.g., the example arcuate direction 320 of FIGS. 3 and 4) (block 1704). For example, the controller 218 may selectively activate a first nozzle (e.g., the first example nozzle 314 of FIGS. 3 and 4) at a first time (e.g., $t=t(1)$) of a time-based sequence. The controller 218 may further selectively activate a second nozzle positioned radially adjacent to the first nozzle along the arcuate direction (e.g., the second example nozzle 318 of FIGS. 3 and 4 positioned radially adjacent the first example nozzle 314 of FIGS. 3 and 4 along the example arcuate direction 320 of FIGS. 3 and 4) at a second time (e.g., t=t(2)) of the time-based sequence subsequent to the first time (t=t(1)) of the time-based sequence. The controller 218 may further deactivate the first nozzle at the second time (e.g., t=t(2)) of the time-based sequence, or at any other time (e.g., t=t(3)) subsequent to the first time (e.g., t=t(1)) of the time-based sequence. A first example method that may be used to implement block 1704 of the example method 1700 of FIG. 17 is described in greater detail below in connection with FIG. 18. A second example method that may be used to implement block 1704 of the example method 1700 of FIG. 17 is described in greater detail below in connection with FIG. 19. Following block 1704, control of the example method 1700 of FIG. 17 proceeds to block 1714.

At block 1706, the example controller 218 of FIG. 2 determines whether to continue operation of the example nozzle activation apparatus 204 of FIG. 2 (block 1706). For example, the controller 218 may receive one or more input control signal(s) via one or more input device(s) of a user interface operatively coupled to the controller 218 indicating that the controller 218 is to deactivate and/or discontinue operation of the nozzle activation apparatus 204. In some examples, the controller 218 may deactivate and/or discontinue operation of the nozzle activation apparatus 204 during cruise of an aircraft including the nozzle activation apparatus 204, and/or while the aircraft is grounded. If the controller 218 determines at block 1706 that the controller 218 is to continue operation of the example nozzle activation apparatus 204, control of the example method 1700 of FIG. 17 returns to block 1704. If the controller 218 instead determines at block 1706 that the controller 218 is not to continue operation of the example nozzle activation apparatus 204, the example method 1700 of FIG. 17 ends.

Figure 18:
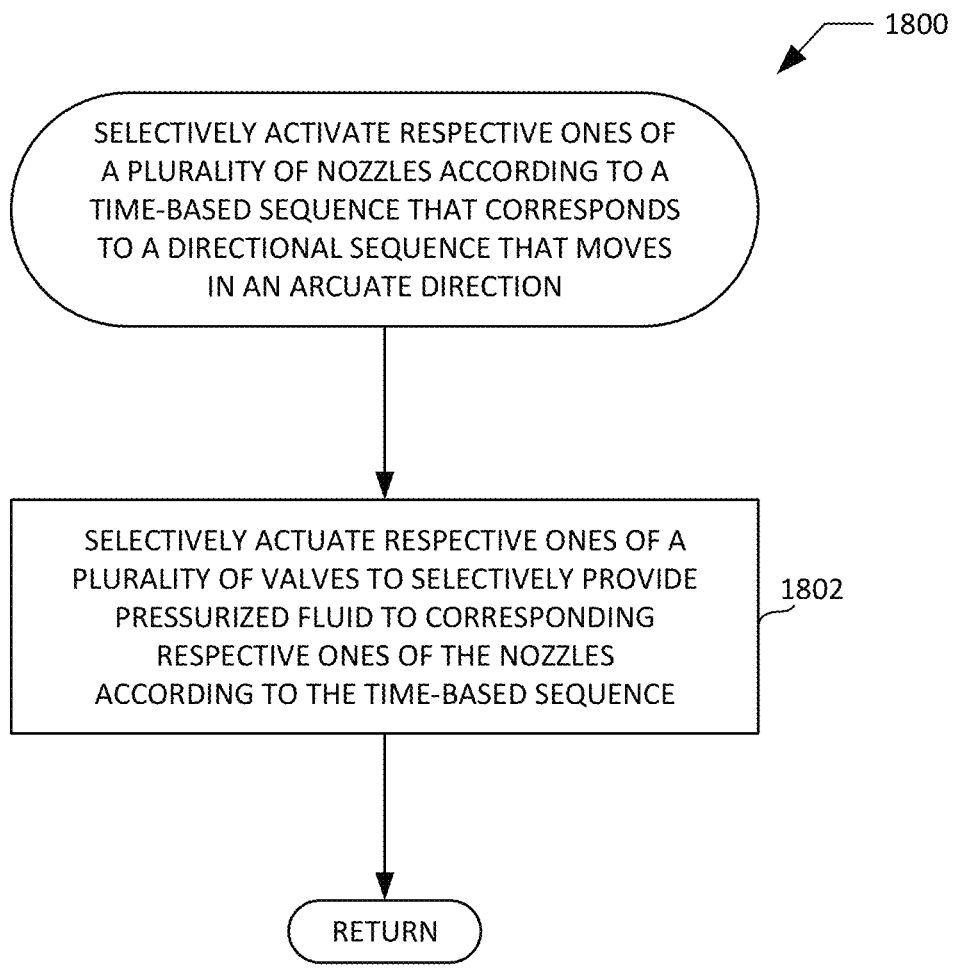
FIG. 18 is a flowchart representative of an example method that may be executed at the example nozzle activation apparatus of the example flow distortion reduction apparatus of FIG. 2 via the first example implementation of the example nozzle activation apparatus of FIGS. 2 and 6A-6C to selectively activate respective ones of the example nozzles of the example flow distortion reduction apparatus.

FIG. 18 is a flowchart representative of an example method 1800 that may be executed at the example nozzle activation apparatus 204 of the example flow distortion reduction apparatus 200 of FIG. 2 via the first example implementation 600 of the example nozzle activation apparatus 204 of FIGS. 2 and 6A-6C to selectively activate respective ones of the example nozzles 208 of the example flow distortion reduction apparatus 200. Example operations of block 1802 of FIG. 16 may be used to implement block 1704 of FIG. 17.

The example method 1800 of FIG. 18 begins when the example controller 218 of FIGS. 2 and 6A-6C selectively actuates respective ones of a plurality of valves (e.g., the first example valve 602, the second example valve 604, and the third example valve 606 of FIGS. 6A-6C) to selectively provide pressurized fluid (e.g., the pressurized fluid 610 of FIGS. 6A-6C) to corresponding respective ones of a plurality of nozzles (e.g., the first example nozzle 612, the second example nozzle 614, and the third example nozzle 616 of FIGS. 6A-6C) according to the time-based sequence implemented by the controller 218 (block 1802).

For example, at block 1802, the controller 218 may selectively actuate (e.g., open) the first valve 602 of FIGS. 6A-6C at a first time (e.g., t=t(1)) of the time-based sequence. In response to the selective actuation of the first valve 602 by the controller 218, the first valve 602 enables the pressurized fluid 610 to be routed and/or distributed to the first nozzle 612 of FIGS. 6A-6C. The receipt of the pressurized fluid 610 at the first nozzle 612 activates the first nozzle 612. In some examples, the second valve 604 and the third valve 606 of FIGS. 6A-6C may not be actuated (e.g., opened) by the controller 218 at the first time of the time-based sequence. At block 1802, the controller 218 may further selectively actuate (e.g., open) the second valve 604 of FIGS. 6A-6C at a second time (e.g., t=t(2)) of the time-based sequence subsequent to the first time. In response to the selective actuation of the second valve 604 by the controller 218, the second valve 604 enables the pressurized fluid 610 to be routed and/or distributed to the second nozzle 614 of FIGS. 6A-6C. The receipt of the pressurized fluid 610 at the second nozzle 614 activates the second nozzle 614. In some examples, the first valve 602 and the third valve 606 of FIGS. 6A-6C may not be actuated (e.g., opened) by the controller 218 at the second time of the time-based sequence. At block 1802, the controller 218 may further selectively actuate (e.g., open) the third valve 606 of FIGS. 6A-6C at a third time (e.g., t=t(3)) of the time-based sequence subsequent to the second time. In response to the selective actuation of the third valve 606 by the controller 218, the third valve 606 enables the pressurized fluid 610 to be routed and/or distributed to the third nozzle 616 of FIGS. 6A-6C. The receipt of the pressurized fluid 610 at the third nozzle 616 activates the third nozzle 616. In some examples, the first valve 602 and the second valve 604 of FIGS. 6A-6C may not be actuated (e.g., opened) by the controller 218 at the third time of the time-based sequence.

The above-described example operations of block 1802 may continue in time and direction according to the time-based sequence implemented by the controller 218 for radially-adjacent ones of the respective nozzles under the selective control of the controller 218 of FIGS. 2 and 6A-6C. Following block 1802, the example method 1800 of FIG. 18 ends and control returns to a calling function or process such as the example program 1700 of FIG. 17.

Figure 19:
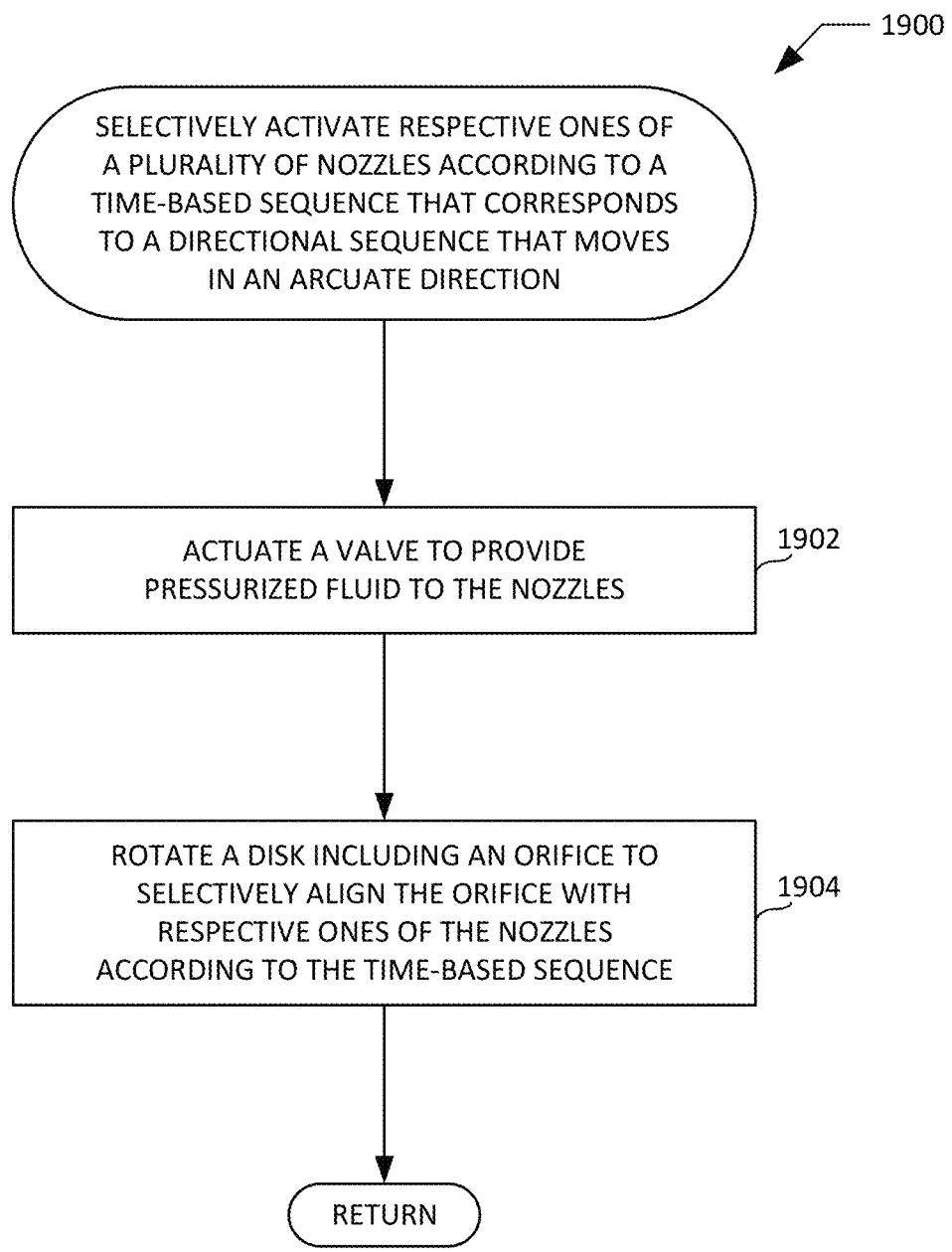
FIG. 19 is a flowchart representative of an example method that may be executed at the example nozzle activation apparatus of the example flow distortion reduction apparatus of FIG. 2 via the second example implementation of the example nozzle activation apparatus of FIGS. 2, 7A-7C, and 8A-8C to selectively activate respective ones of the example nozzles of the example flow distortion reduction apparatus.

FIG. 19 is a flowchart representative of an example method 1900 that may be executed at the example nozzle activation apparatus 204 of the example flow distortion reduction apparatus 200 of FIG. 2 via the second example implementation 700 of the example nozzle activation apparatus 204 of FIGS. 2, 7A-7C, and 8A-8C to selectively activate respective ones of the example nozzles 208 of the example flow distortion reduction apparatus 200. Example operations of blocks 1902 and 1904 of FIG. 19 may be used to implement block 1704 of FIG. 17.

The example method 1900 of FIG. 19 begins when the example controller 218 of FIGS. 2 and 7A-7C actuates a valve (e.g., the valve 702 of FIGS. 7A-7C) to provide pressurized fluid (e.g., the pressurized fluid 710 of FIGS. 7A-7C) to respective ones of a plurality of nozzles (e.g., the first example nozzle 712, the second example nozzle 714, and the third example nozzle 716 of FIGS. 7A-7C and 8A-8C) according to the time-based sequence implemented by the controller 218 (block 1902). Following block 1902, control of the example method 1900 of FIG. 19 proceeds to block 1904.

At block 1904, the example controller 218 of FIGS. 2 and 7A-7C actuates (e.g., rotates) a rotatable disk including an orifice (e.g., the example rotatable disk 704 including the example orifice 706 of FIGS. 7A-7C and 8A-8C) to selectively align the orifice with respective ones of a plurality of nozzles (e.g., the first example nozzle 712, the second example nozzle 714, and the third example nozzle 716 of FIGS. 7A-7C and 8A-8C) according to the time-based sequence implemented by the controller 218 (block 1904).

For example, at block 1904, the controller 218 may actuate (e.g., rotate) the rotatable disk 704 of FIGS. 7A-7C and 8A-8C to selectively align the orifice 706 of the rotatable disk 704 with the first nozzle 712 at a first time (e.g., t=t(1)) of the time-based sequence. The alignment of the orifice 706 of the rotatable disk 704 with the first nozzle 712 activates the first nozzle 712. At block 1904, the controller 218 may further actuate (e.g., rotate) the rotatable disk 704 of FIGS. 7A-7C and 8A-8C to selectively align the orifice 706 of the rotatable disk 704 with the second nozzle 714 at a second time (e.g., t=t(2)) of the time-based sequence subsequent to the first time. The alignment of the orifice 706 of the rotatable disk 704 with the second nozzle 714 activates the second nozzle 714. At block 1904, the controller 218 may further actuate (e.g., rotate) the rotatable disk 704 of FIGS. 7A-7C and 8A-8C to selectively align the orifice 706 of the rotatable disk 704 with the third nozzle 716 at a third time (e.g., t=t(3)) of the time-based sequence subsequent to the second time. The alignment of the orifice 706 of the rotatable disk 704 with the third nozzle 716 activates the third nozzle 716.

The above-described example operations of block 1904 may continue in time and direction according to the time-based sequence implemented by the controller 218 for radially-adjacent ones of the respective nozzles to be activated by the controller 218 according to the time-based sequence. Following block 1904, the example method 1900 of FIG. 19 ends and control returns to a calling function or process such as the example program 1700 of FIG. 17.

Figure 20:
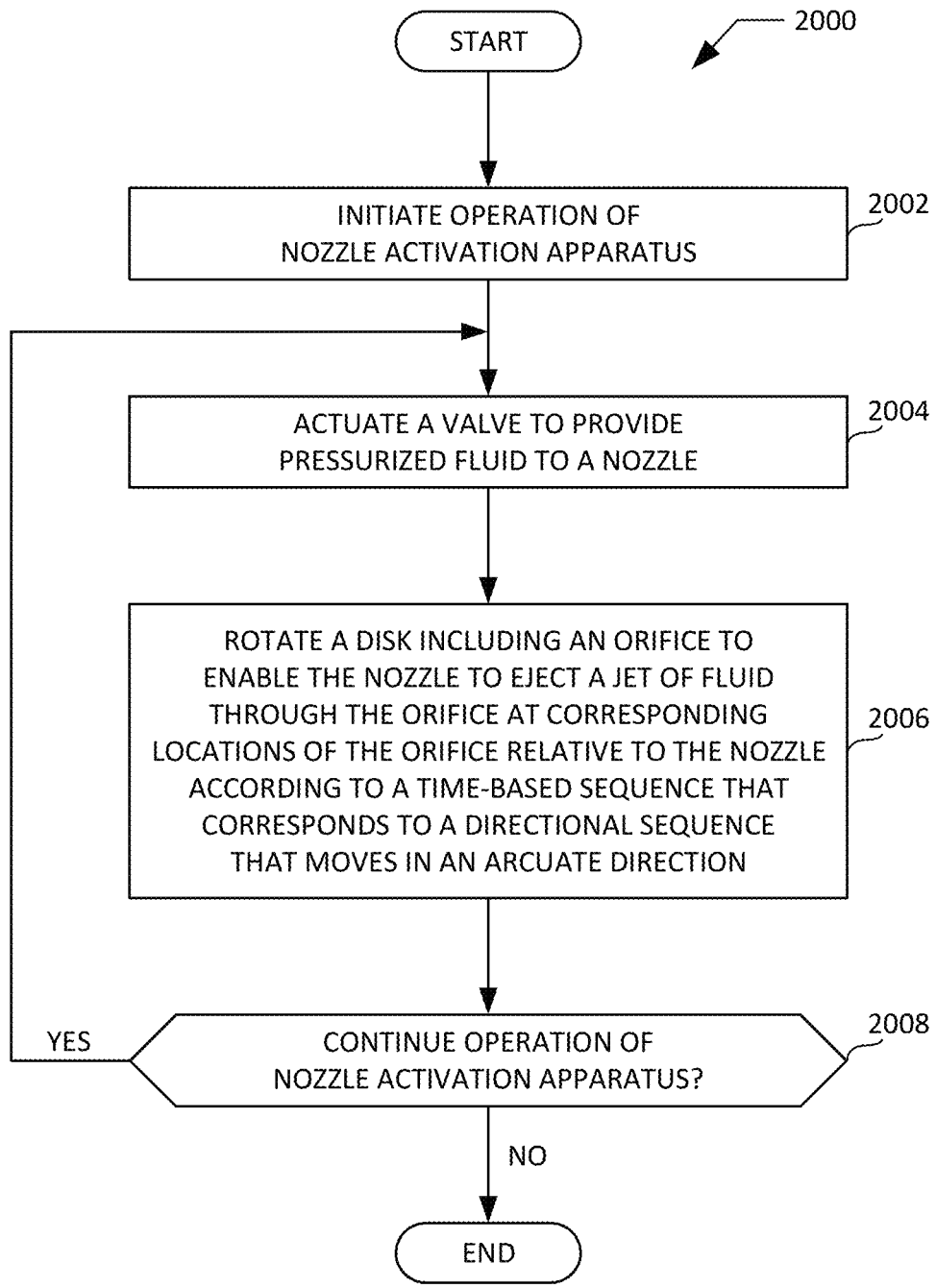
FIG. 20 is a flowchart representative of an example method that may be executed at the example nozzle activation apparatus of the example flow distortion reduction apparatus of FIG. 2 via the third example implementation of the example nozzle activation apparatus of FIGS. 2, 9A-9C, and 10A-10C to reduce flow distortion at an engine fan of a nacelle.

FIG. 20 is a flowchart representative of an example method 2000 that may be executed at the example nozzle activation apparatus 204 of the example flow distortion reduction apparatus 200 of FIG. 2 via the third example implementation 900 of the example nozzle activation apparatus 204 of FIGS. 2, 9A-9C, and 10A-10C to reduce flow distortion at an engine fan of a nacelle (e.g., the example engine fan 212 of the example engine 210 of the example nacelle 202 of FIG. 2). The example method 2000 begins when the example controller 218 of FIG. 2 initiates operation of the example nozzle activation apparatus 204 of FIG. 2 (block 2002). For example, the controller 218 may receive one or more input control signal(s) via one or more input device(s) of a user interface operatively coupled to the controller 218 indicating that the controller 218 is to activate and/or initiate operation of the nozzle activation apparatus 204. In some examples, the controller 218 may initiate operation of the nozzle activation apparatus 204 during takeoff or landing of an aircraft including the nozzle activation apparatus 204. Following block 2002, control of the example method 2000 of FIG. 20 proceeds to block 2004.

At block 2004, the example controller 218 of FIGS. 2 and 9A-9C actuates a valve (e.g., the valve 902 of FIGS. 9A-9C) to provide pressurized fluid (e.g., the pressurized fluid 910 of FIGS. 9A-9C) to a nozzle (e.g., the nozzle 912 of FIGS. 9A-9C and 10A-10C) (block 2004). In some examples, the nozzle extends circumferentially about an inner wall of a nacelle such that the nozzle has a generally ring-shaped profile. Following block 2004, control of the example method 2000 of FIG. 20 proceeds to block 2006.

At block 2006, the example controller 218 of FIGS. 2 and 9A-9C actuates (e.g., rotates) a rotatable disk including an orifice (e.g., the example rotatable disk 904 including the example orifice 906 of FIGS. 9A-9C) to enable the nozzle (e.g., the nozzle 912 of FIGS. 9A-9C) to eject a jet of fluid (e.g., the example fluid jet 916 of FIGS. 9A-9C) through the orifice at corresponding locations (e.g., the first example location 914, the second example location 918, and the third example location 920 of FIGS. 9A-9C) relative to the nozzle according to a time-based sequence implemented by the controller 218 that corresponds to a directional sequence that moves in an arcuate direction (e.g., the example arcuate direction 1002 of FIGS. 10A-10C) (block 2006).

For example, at block 2006, the controller 218 may actuate (e.g., rotate) the rotatable disk 904 of FIGS. 9A-9C and 10A-10C in the arcuate direction 1002 of FIGS. 10A-10C to move the orifice 906 of the rotatable disk 904 to the first location 914 of FIGS. 9A and 10A at a first time (e.g., t=t(1)) of the time-based sequence. The movement of the orifice 906 to the first location 914 enables the nozzle 912 to eject the fluid jet 916 through the orifice 906 at the first location 914. At block 2006, the controller 218 may further actuate (e.g., rotate) the rotatable disk 904 of FIGS. 9A-9C and 10A-10C in the arcuate direction 1002 to move the orifice 906 of the rotatable disk 904 from the first location 914 to the second location 918 of FIGS. 9B and 10B at a second time (e.g., t=t(2)) of the time-based sequence. The movement of the orifice 906 to the second location 918 enables the nozzle 912 to eject the fluid jet 916 through the orifice 906 at the second location 918. At block 2006, the controller 218 may further actuate (e.g., rotate) the rotatable disk 904 of FIGS. 9A-9C and 10A-10C in the arcuate direction 1002 to move the orifice 906 of the rotatable disk 904 from the second location 918 to the third location 920 of FIGS. 9C and 10C at a third time (e.g., t=t(3)) of the time-based sequence. The movement of the orifice 906 to the third location 920 enables the nozzle 912 to eject the fluid jet 916 through the orifice 906 at the third location 920. The above-described example operations of block 2006 may continue in time and direction according to the time-based sequence implemented by the controller 218. Following block 2006, control of the example method 2000 of FIG. 20 proceeds to block 2008.

At block 2008, the example controller 218 of FIG. 2 determines whether to continue operation of the example nozzle activation apparatus 204 of FIG. 2 (block 2008). For example, the controller 218 may receive one or more input control signal(s) via one or more input device(s) of a user interface operatively coupled to the controller 218 indicating that the controller 218 is to deactivate and/or discontinue operation of the nozzle activation apparatus 204. In some examples, the controller 218 may deactivate and/or discontinue operation of the nozzle activation apparatus 204 during cruise of an aircraft including the nozzle activation apparatus 204, and/or while the aircraft is grounded. If the controller 218 determines at block 2008 that the controller 218 is to continue operation of the example nozzle activation apparatus 204, control of the example method 2000 of FIG. 20 returns to block 2004. If the controller 218 instead determines at block 2008 that the controller 218 is not to continue operation of the example nozzle activation apparatus 204, the example method 2000 of FIG. 20 ends.

Figure 21:
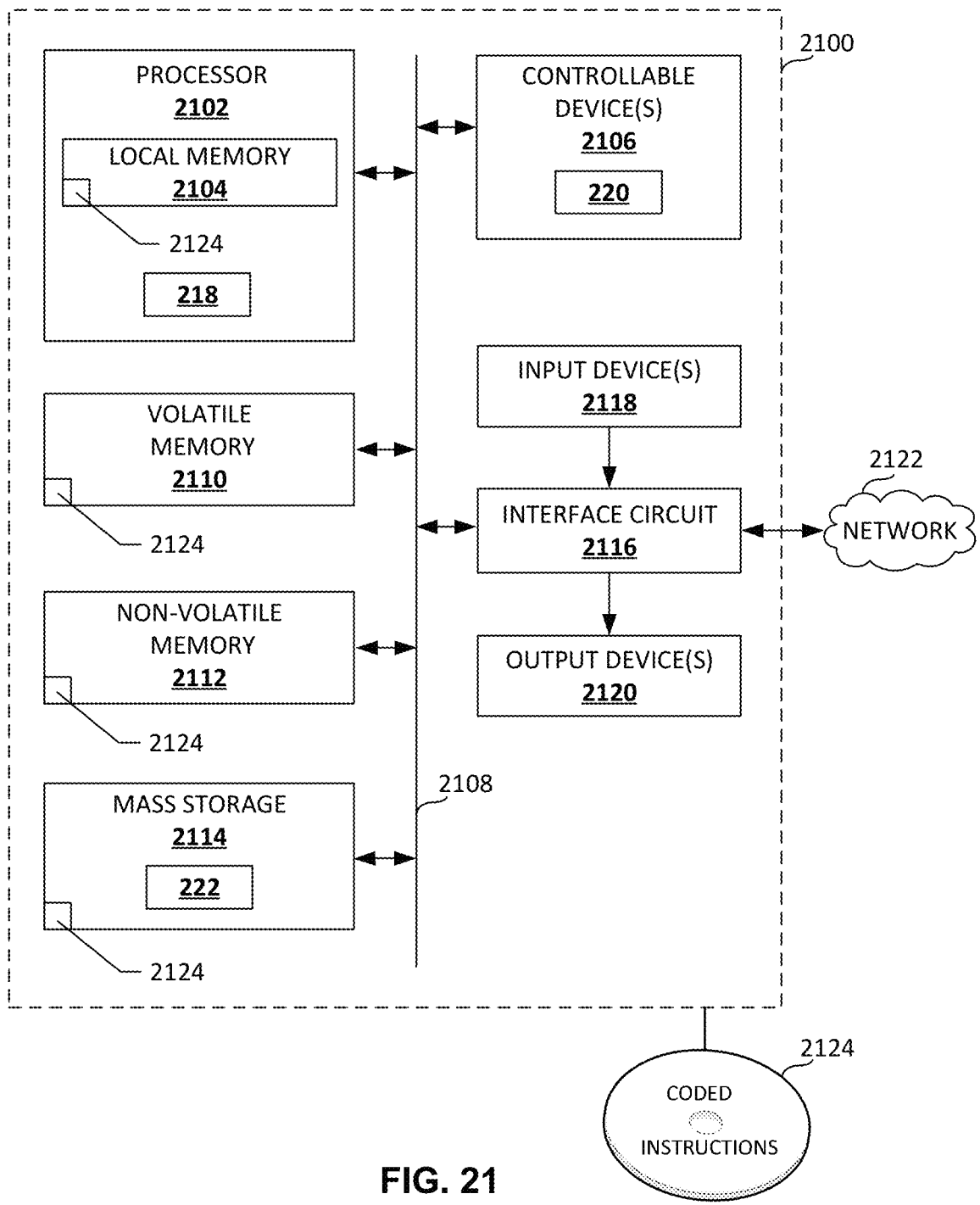
FIG. 21 is a block diagram of an example processor platform capable of executing instructions to implement the methods of FIGS. 17-20 and the example nozzle activation apparatus of the example flow distortion reduction apparatus of FIG. 2.

FIG. 21 is a block diagram of an example processor platform 2100 capable of executing instructions to implement the methods of FIGS. 17-20 and the example nozzle activation apparatus 204 of the example flow distortion reduction apparatus 200 of FIG. 2. The processor platform 2100 of the illustrated example includes a processor 2102. The processor 2102 of the illustrated example is hardware. For example, the processor 2102 can be implemented by one or more integrated circuit(s), logic circuit(s), microprocessor(s) or controller(s) from any desired family or manufacturer. In the example of FIG. 21, the processor 2102 implements the example controller 218 of FIG. 2. The processor 2102 of the illustrated example also includes a local memory 2104 (e.g., a cache).

The processor 2102 of the illustrated example is in communication with one or more example controllable device(s) 2106 via a bus 2108. In the example of FIG. 21, the controllable device(s) 2106 include the example controllable device(s) 220 of FIG. 2.

The processor 2102 of the illustrated example is also in communication with a main memory including a volatile memory 2110 and a non-volatile memory 2112 via the bus 2108. The volatile memory 2110 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2112 may be implemented by flash memory and/or any other desired type of memory device. Access to the volatile memory 2110 and the non-volatile memory 2112 is controlled by a memory controller.

The processor 2102 of the illustrated example is also in communication with one or more mass storage device(s) 2114 for storing software and/or data. Examples of such mass storage device(s) 2114 include floppy disk drives, hard drive disks, compact disk drives, Blu-ray disk drives, RAID systems, and digital versatile disk (DVD) drives. In the example of FIG. 21, the mass storage device(s) 2114 include the example memory 222 of FIG. 2.

The processor platform 2100 of the illustrated example also includes an interface circuit 2116. The interface circuit 2116 may be implemented by any type of interface standard, such as an Ethernet interface, a universal serial bus (USB), and/or a PCI express interface.

In the illustrated example, one or more input device(s) 2118 are connected to the interface circuit 2116. The input device(s) 2118 permit(s) a user to enter data and/or commands into the processor 2102. The input device(s) 2118 can be implemented by, for example, a button, a switch, a dial, an audio sensor, a camera (still or video), a keyboard, a mouse, a touchscreen, a track-pad, a trackball, isopoint, a voice recognition system, a microphone, and/or a liquid crystal display.

One or more output device(s) 2120 are also connected to the interface circuit 2116 of the illustrated example. The output device(s) 2120 can be implemented, for example, by a light emitting diode, an organic light emitting diode, a liquid crystal display, a touchscreen and/or a speaker. The interface circuit 2116 of the illustrated example, thus, typically includes a graphics driver such as a graphics driver chip and/or processor.

The interface circuit 2116 of the illustrated example also includes a communication device such as a transmitter, a receiver, a transceiver, a modem and/or network interface card to facilitate exchange of data with external machines (e.g., controllers and/or computing devices of any kind) via a network 2122 (e.g., a wired or wireless communication network, such as an Ethernet connection, a digital subscriber line (DSL), a telephone line, coaxial cable, a cellular telephone system, a wireless local area network (WLAN), etc.).

Coded instructions 2124 for implementing the method 1700 of FIG. 17, the method 1800 of FIG. 18, the method 1900 of FIG. 19, and/or the method 2000 of FIG. 20 may be stored in the local memory 2104, in the volatile memory 2110, in the non-volatile memory 2112, in the mass storage device(s) 2114, and/or on a removable tangible computer readable storage medium such as a CD or DVD.

From the foregoing, it will be appreciated that the disclosed flow distortion reduction methods and apparatus provide numerous advantages over conventional methods and apparatus for reducing flow distortion at an engine fan of a nacelle. For example, the disclosed flow distortion reduction methods and apparatus advantageously reduce the flow distortion and pressure loss at an engine fan of a nacelle to acceptable levels while requiring a reduced amount of engine bleed relative to the known methods and apparatus for reducing flow distortion described above.

In some examples, by selectively activating respective ones of a plurality of nozzles according to a time-based sequence, the disclosed flow distortion reduction methods and apparatus advantageously provide continuous flow injection coverage relative to a circumferential section of an inner wall of a nacelle extending between an inlet of the nacelle and an engine fan of the nacelle, such that each arcuate portion and/or segment of the circumferential section is subjected to the injected flow at a corresponding time determined and/or defined by the time-based sequence. Selectively activating the respective ones of the nozzles of the disclosed flow distortion reduction methods and apparatus according to the time-based sequence energizes the boundary layer associated with a fluid flowing into and/or through the nacelle along the above-described circumferential section, thereby reducing the occurrence of flow distortion (e.g., separated flow associated with a fluid flowing along the inner wall of the nacelle) at the engine fan of the nacelle.

In other examples, by rotating a disk to enable a nozzle to eject a jet of fluid through an orifice of the disk at corresponding locations of the orifice relative to the nozzle according to a time-based sequence, the disclosed flow distortion reduction methods and apparatus advantageously provide continuous flow injection coverage relative to a circumferential section of an inner wall of a nacelle extending between an inlet of the nacelle and an engine fan of the nacelle, such that each arcuate portion and/or segment of the circumferential section is subjected to the injected flow at a corresponding time determined and/or defined by the time-based sequence. Rotating the disk to enable the nozzle to eject the jet of fluid through the orifice at corresponding locations of the orifice relative to the nozzle according to the time-based sequence energizes the boundary layer associated with a fluid flowing into and/or through the nacelle along the above-described circumferential section, thereby reducing the occurrence of flow distortion (e.g., separated flow associated with a fluid flowing along the inner wall of the nacelle) at the engine fan of the nacelle.

The disclosed flow distortion reduction methods and apparatus advantageously reduce flow distortion at the engine fan of the nacelle irrespective of the instantaneous direction of any crosswind that the nacelle may encounter during a flight of an aircraft to which the nacelle is coupled. Moreover, the disclosed flow distortion reduction methods and apparatus advantageously reduce flow distortion at the engine fan of the nacelle while requiring a relatively low amount of engine bleed to facilitate the selective activation of the respective ones of the nozzles.

The aforementioned advantages and/or benefits are achieved via the disclosed methods and apparatus for reducing flow distortion at engine fans of nacelles. In some examples, an apparatus for reducing flow distortion at an engine fan of a nacelle is disclosed. In some disclosed examples, the apparatus comprises a plurality of nozzles radially spaced about an inner wall of the nacelle. In some disclosed examples, respective ones of the nozzles are positioned to eject corresponding respective jets of fluid adjacent the inner wall in a downstream direction toward the engine fan. In some disclosed examples, the apparatus further comprises a controller to selectively activate the respective ones of the nozzles according to a time-based sequence. In some disclosed examples, the time-based sequence corresponds to a directional sequence that moves in an arcuate direction along a circumference of the inner wall.

In some disclosed examples of the apparatus, the controller is to activate a first one of the nozzles at a first time associated with the time-based sequence. In some disclosed examples, the controller is to activate a second one of the nozzles at a second time associated with the time-based sequence. In some disclosed examples, the second one of the nozzles is radially adjacent the first one of the nozzles along the arcuate direction. In some disclosed examples, the second time is different from the first time. In some disclosed examples, the controller is to deactivate the first one of the nozzles at the second time. In some disclosed examples, the controller is to deactivate the first one of the nozzles at a third time associated with the time-based sequence. In some disclosed examples, the third time is different from the first time and different from the second time.

In some disclosed examples of the apparatus, the controller is to activate a first set of the nozzles at a first time associated with the time-based sequence. In some disclosed examples, the controller is to activate a second set of the nozzles at a second time associated with the time-based sequence. In some disclosed examples, the second set of the nozzles is radially adjacent the first set of the nozzles along the arcuate direction. In some disclosed examples, the second time is different from the first time. In some disclosed examples, the controller is to deactivate the first set of the nozzles at the second time. In some disclosed examples, the controller is to deactivate the first set of the nozzles at a third time associated with the time-based sequence. In some disclosed examples, the third time is different from the first time and different from the second time.

In some disclosed examples, the apparatus further comprises a plurality of valves. In some disclosed examples, respective ones of the valves are operatively coupled to the controller and operatively positioned to selectively enable fluid communication between a pressurized fluid source and corresponding respective ones of the nozzles. In some disclosed examples, the controller is to selectively actuate the respective ones of the valves to selectively provide pressurized fluid from the pressurized fluid source to the corresponding respective ones of the nozzles according to the time-based sequence.

In some disclosed examples, the apparatus further comprises a valve. In some disclosed examples, the valve is operatively coupled to the controller and operatively positioned to selectively enable fluid communication between a pressurized fluid source and the nozzles. In some disclosed examples, the controller is to actuate the valve to provide pressurized fluid from the pressurized fluid source to the nozzles. In some disclosed examples, the apparatus further comprises a disk including an orifice. In some disclosed examples, the controller is to rotate the disk around the inner wall of the nacelle to selectively align the orifice with respective ones of the nozzles according to the time-based sequence. In some disclosed examples, a first one of the nozzles is to eject a first jet of fluid when the orifice is aligned with the first one of the nozzles and the valve is actuated to provide the pressurized fluid to the nozzles.

In some examples, a method for reducing flow distortion at an engine fan of a nacelle is disclosed. In some disclosed examples, the method comprises selectively activating respective ones of a plurality of nozzles via a controller according to a time-based sequence. In some disclosed examples, the nozzles are radially spaced about an inner wall of the nacelle. In some disclosed examples, respective ones of the nozzles are positioned to eject corresponding respective jets of fluid adjacent the inner wall in a downstream direction toward the engine fan. In some disclosed examples, the time-based sequence corresponds to a directional sequence that moves in an arcuate direction along a circumference of the inner wall.

In some disclosed examples of the method, the selectively activating of the respective ones of the nozzles further comprises activating a first one of the nozzles via the controller at a first time associated with the time-based sequence. In some disclosed examples, the selectively activating of the respective ones of the nozzles further comprises activating a second one of the nozzles via the controller at a second time associated with the time-based sequence. In some disclosed examples, the second one of the nozzles is radially adjacent the first one of the nozzles along the arcuate direction. In some disclosed examples, the second time is different from the first time. In some disclosed examples, the selectively activating of the respective ones of the nozzles further comprises deactivating the first one of the nozzles via the controller at the second time. In some disclosed examples, the selectively activating of the respective ones of the nozzles further comprises deactivating the first one of the nozzles via the controller at a third time associated with the time-based sequence. In some disclosed examples, the third time is different from the first time and different from the second time.

In some disclosed examples of the method, the selectively activating of the respective ones of the nozzles further comprises activating a first set of the nozzles via the controller at a first time associated with the time-based sequence. In some disclosed examples, the selectively activating of the respective ones of the nozzles further comprises activating a second set of the nozzles via the controller at a second time associated with the time-based sequence. In some disclosed examples, the second set of the nozzles is radially adjacent the first set of the nozzles along the arcuate direction. In some disclosed examples, the second time is different from the first time. In some disclosed examples, the selectively activating of the respective ones of the nozzles further comprises deactivating the first set of the nozzles via the controller at the second time. In some disclosed examples, the selectively activating of the respective ones of the nozzles further comprises deactivating the first set of the nozzles via the controller at a third time associated with the time-based sequence. In some disclosed examples, the third time is different from the first time and different from the second time.

In some disclosed examples of the method, the selectively activating of the respective ones of the nozzles further comprises selectively actuating respective ones of a plurality of valves via the controller to selectively provide pressurized fluid from a pressurized fluid source to corresponding respective ones of the nozzles according to the time-based sequence. In some disclosed examples, respective ones of the valves are operatively coupled to the controller and operatively positioned to selectively enable fluid communication between the pressurized fluid source and the corresponding respective ones of the nozzles.

In some disclosed examples of the method, the selectively activating of the respective ones of the nozzles further comprises actuating a valve via the controller to provide pressurized fluid from a pressurized fluid source to the nozzles. In some disclosed examples, the valve is operatively coupled to the controller and operatively positioned to selectively enable fluid communication between the pressurized fluid source and the nozzles. In some disclosed examples, the selectively activating of the respective ones of the nozzles further comprises rotating a disk including an orifice around the inner wall of the nacelle via the controller to selectively align the orifice with respective ones of the nozzles according to the time-based sequence. In some disclosed examples, a first one of the nozzles is to eject a first jet of fluid when the orifice is aligned with the first one of the nozzles and the valve is actuated to provide the pressurized fluid to the nozzles.

In some examples, a non-transitory machine readable storage medium comprising instructions is disclosed. In some disclosed examples, the instructions, when executed, cause a controller to selectively activate respective ones of a plurality of nozzles according to a time-based sequence. In some disclosed examples, the nozzles are radially spaced about an inner wall of a nacelle. In some disclosed examples, respective ones of the nozzles are positioned to eject corresponding respective jets of fluid adjacent the inner wall in a downstream direction toward an engine fan located within the nacelle. In some disclosed examples, the time-based sequence corresponds to a directional sequence that moves in an arcuate direction along a circumference of the inner wall.

In some disclosed examples of the non-transitory machine readable storage medium, the instructions, when executed, cause the controller to selectively activate the respective ones of the nozzles by causing the controller to activate a first one of the nozzles at a first time associated with the time-based sequence. In some disclosed examples, the instructions, when executed, cause the controller to selectively activate the respective ones of the nozzles by causing the controller to activate a second one of the nozzles at a second time associated with the time-based sequence. In some disclosed examples, the second one of the nozzles is radially adjacent the first one of the nozzles along the arcuate direction. In some disclosed examples, the second time is different from the first time. In some disclosed examples, the instructions, when executed, cause the controller to selectively activate the respective ones of the nozzles by causing the controller to deactivate the first one of the nozzles at the second time. In some disclosed examples, the instructions, when executed, cause the controller to selectively activate the respective ones of the nozzles by causing the controller to deactivate the first one of the nozzles at a third time associated with the time-based sequence. In some disclosed examples, the third time is different from the first time and different from the second time.

In some disclosed examples of the non-transitory machine readable storage medium, the instructions, when executed, cause the controller to selectively activate the respective ones of the nozzles by causing the controller to activate a first set of the nozzles at a first time associated with the time-based sequence. In some disclosed examples, the instructions, when executed, cause the controller to selectively activate the respective ones of the nozzles by causing the controller to activate a second set of the nozzles at a second time associated with the time-based sequence. In some disclosed examples, the second set of the nozzles is radially adjacent the first set of the nozzles along the arcuate direction. In some disclosed examples, the second time is different from the first time. In some disclosed examples, the instructions, when executed, cause the controller to selectively activate the respective ones of the nozzles by causing the controller to deactivate the first set of the nozzles at the second time. In some disclosed examples, the instructions, when executed, cause the controller to selectively activate the respective ones of the nozzles by causing the controller to deactivate the first set of the nozzles at a third time associated with the time-based sequence. In some disclosed examples, the third time is different from the first time and different from the second time.

In some disclosed examples of the non-transitory machine readable storage medium, the instructions, when executed, cause the controller to selectively activate the respective ones of the nozzles by causing the controller to selectively actuate respective ones of a plurality of valves to selectively provide pressurized fluid from a pressurized fluid source to corresponding respective ones of the nozzles according to the time-based sequence. In some disclosed examples, respective ones of the valves are operatively coupled to the controller and operatively positioned to selectively enable fluid communication between the pressurized fluid source and the corresponding respective ones of the nozzles.

In some disclosed examples of the non-transitory machine readable storage medium, the instructions, when executed, cause the controller to selectively activate the respective ones of the nozzles by causing the controller to actuate a valve to provide pressurized fluid from a pressurized fluid source to the nozzles. In some disclosed examples, the valve is operatively coupled to the controller and operatively positioned to selectively enable fluid communication between the pressurized fluid source and the nozzles. In some disclosed examples, the instructions, when executed, cause the controller to selectively activate the respective ones of the nozzles by causing the controller to rotate a disk including an orifice around the inner wall of the nacelle to selectively align the orifice with respective ones of the nozzles according to the time-based sequence. In some disclosed examples, a first one of the nozzles is to eject a first jet of fluid when the orifice is aligned with the first one of the nozzles and the valve is actuated to provide the pressurized fluid to the nozzles.

In some examples, an apparatus for reducing flow distortion at an engine fan of a nacelle is disclosed. In some disclosed examples, the apparatus comprises a nozzle extending circumferentially about an inner wall of the nacelle. In some disclosed examples, the nozzle is positioned to eject a jet of fluid adjacent the inner wall in a downstream direction toward the engine fan. In some disclosed examples, the apparatus further comprises a controller to activate the nozzle according to a time-based sequence. In some disclosed examples, the time-based sequence corresponds to a directional sequence that moves in an arcuate direction along a circumference of the inner wall. In some disclosed examples, the apparatus further comprises a valve operatively coupled to the controller and operatively positioned to selectively enable fluid communication between a pressurized fluid source and the nozzle. In some disclosed examples, the controller is to actuate the valve to provide pressurized fluid from the pressurized fluid source to the nozzle. In some disclosed examples, the apparatus further comprises a disk including an orifice. In some disclosed examples, the controller is to rotate the disk in the arcuate direction around the inner wall of the nacelle to enable the nozzle to eject the jet of fluid through the orifice at corresponding locations of the orifice relative to the nozzle according to the time-based sequence.

In some disclosed examples of the apparatus, the controller is to rotate the disk in the arcuate direction to move the orifice of the disk to a first location relative to the nozzle at a first time associated with the time-based sequence. In some disclosed examples of the apparatus, the controller is further to rotate the disk in the arcuate direction to move the orifice of the disk from the first location to a second location relative to the nozzle at a second time associated with the time-based sequence. In some disclosed examples of the apparatus, the nozzle has a ring-shaped profile. In some disclosed examples of the apparatus, the orifice has an arc-shaped profile.

In some examples, a method for reducing flow distortion at an engine fan of a nacelle is disclosed. In some disclosed examples, the method comprises actuating a valve via a controller to provide pressurized fluid from a pressurized fluid source to a nozzle. In some disclosed examples, the valve is operatively coupled to the controller and operatively positioned to selectively enable fluid communication between the pressurized fluid source and the nozzle. In some disclosed examples, the nozzle extends circumferentially about an inner wall of the nacelle. In some disclosed examples, the nozzle is positioned to eject a jet of fluid adjacent the inner wall in a downstream direction toward the engine fan according to a time-based sequence. In some disclosed examples, the time-based sequence corresponds to a directional sequence that moves in an arcuate direction along a circumference of the inner wall. In some disclosed examples, the method further comprises rotating a disk including an orifice in the arcuate direction around the inner wall of the nacelle via the controller to enable the nozzle to eject the jet of fluid through the orifice at corresponding locations of the orifice relative to the nozzle according to the time-based sequence.

In some disclosed examples of the method, the rotating of the disk further comprises rotating the disk in the arcuate direction to move the orifice of the disk to a first location relative to the nozzle at a first time associated with the time-based sequence. In some disclosed examples of the method, the rotating of the disk further comprises rotating the disk in the arcuate direction to move the orifice of the disk from the first location to a second location relative to the nozzle at a second time associated with the time-based sequence. In some disclosed examples of the method, the nozzle has a ring-shaped profile. In some disclosed examples of the method, the orifice has an arc-shaped profile.

In some examples, a non-transitory machine readable storage medium comprising instructions is disclosed. In some disclosed examples, the instructions, when executed, cause a controller to actuate a valve to provide pressurized fluid from a pressurized fluid source to a nozzle. In some disclosed examples, the valve is operatively coupled to the controller and operatively positioned to selectively enable fluid communication between the pressurized fluid source and the nozzle. In some disclosed examples, the nozzle extends circumferentially about an inner wall of a nacelle. In some disclosed examples, the nozzle is positioned to eject a jet of fluid adjacent the inner wall in a downstream direction toward the engine fan according to a time-based sequence. In some disclosed examples, the time-based sequence corresponds to a directional sequence that moves in an arcuate direction along a circumference of the inner wall. In some disclosed examples, the instructions, when executed further cause the controller to rotate a disk including an orifice in the arcuate direction around the inner wall of the nacelle to enable the nozzle to eject the jet of fluid through the orifice at corresponding locations of the orifice relative to the nozzle according to the time-based sequence.

In some disclosed examples of the non-transitory machine readable storage medium, the instructions, when executed, cause the controller to rotate the disk by causing the controller to rotate the disk in the arcuate direction to move the orifice of the disk to a first location relative to the nozzle at a first time associated with the time-based sequence. In some disclosed examples, the instructions, when executed, further cause the controller to rotate the disk in the arcuate direction to move the orifice of the disk from the first location to a second location relative to the nozzle at a second time associated with the time-based sequence. In some disclosed examples of the non-transitory machine readable storage medium, the nozzle has a ring-shaped profile. In some disclosed examples of the non-transitory machine readable storage medium, the orifice has an arc-shaped profile.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for reducing flow distortion at an engine fan of a nacelle, the apparatus comprising:
   a nozzle extending circumferentially about an inner wall of the nacelle, the nozzle positioned to eject a jet of fluid adjacent the inner wall in a downstream direction toward the engine fan;
   a controller to activate the nozzle according to a time-based sequence, the time-based sequence corresponding to a directional sequence that moves in an arcuate direction along a circumference of the inner wall;
   a valve operatively coupled to the controller and operatively positioned to selectively enable fluid communication between a pressurized fluid source and the nozzle, the controller to actuate the valve to provide pressurized fluid from the pressurized fluid source to the nozzle; and
   a disk including an orifice, the controller to rotate the disk in the arcuate direction around the inner wall of the nacelle to enable the nozzle to eject the jet of fluid through the orifice at corresponding locations of the orifice relative to the nozzle according to the time-based sequence.

2. The apparatus of claim 1, wherein the controller is to:
   rotate the disk in the arcuate direction to move the orifice of the disk to a first location relative to the nozzle at a first time associated with the time-based sequence; and
   rotate the disk in the arcuate direction to move the orifice of the disk from the first location to a second location relative to the nozzle at a second time associated with the time-based sequence.

3. The apparatus of claim 1, wherein the nozzle has a ring-shaped profile.

4. The apparatus of claim 1, wherein the disk has a ring-shaped profile.

5. The apparatus of claim 1, wherein the orifice has an arc-shaped profile.

6. The apparatus of claim 1, wherein the nozzle has a first ring-shaped profile, the disk has a second ring-shaped profile, and the orifice has an arc-shaped profile.

7. The apparatus of claim 1, wherein the disk is located within an interior compartment of the nacelle formed between the inner wall and an outer wall of the nacelle.

8. The apparatus of claim 7, wherein the nozzle is aligned with a rearward-facing stepped aperture formed in the inner wall, and wherein the disk is positioned between the nozzle and the rearward-facing stepped aperture.

9. The apparatus of claim 7, wherein the valve is located within the interior compartment.

10. The apparatus of claim 7, wherein the controller is located within the interior compartment.

11. A method for reducing flow distortion at an engine fan of a nacelle, the method comprising:
- actuating a valve via a controller to provide pressurized fluid from a pressurized fluid source to a nozzle, the valve being operatively coupled to the controller and operatively positioned to selectively enable fluid communication between the pressurized fluid source and the nozzle, the nozzle extending circumferentially about an inner wall of the nacelle, the nozzle positioned to eject a jet of fluid adjacent the inner wall in a downstream direction toward the engine fan according to a time-based sequence, the time-based sequence corresponding to a directional sequence that moves in an arcuate direction along a circumference of the inner wall; and
- rotating a disk including an orifice in the arcuate direction around the inner wall of the nacelle via the controller to enable the nozzle to eject the jet of fluid through the orifice at corresponding locations of the orifice relative to the nozzle according to the time-based sequence.

12. The method of claim 11, wherein the rotating of the disk further comprises:
- rotating the disk in the arcuate direction to move the orifice of the disk to a first location relative to the nozzle at a first time associated with the time-based sequence; and
- rotating the disk in the arcuate direction to move the orifice of the disk from the first location to a second location relative to the nozzle at a second time associated with the time-based sequence.

13. The method of claim 11, wherein the nozzle has a ring-shaped profile.

14. The method of claim 11, wherein the disk has a ring-shaped profile.

15. The method of claim 11, wherein the orifice has an arc-shaped profile.

16. The method of claim 11, wherein the nozzle has a first ring-shaped profile, the disk has a second ring-shaped profile, and the orifice has an arc-shaped profile.

17. The method of claim 11, wherein the disk is located within an interior compartment of the nacelle formed between the inner wall and an outer wall of the nacelle.

18. The method of claim 17, wherein the nozzle is aligned with a rearward-facing stepped aperture formed in the inner wall, and wherein the disk is positioned between the nozzle and the rearward-facing stepped aperture.

19. The method of claim 17, wherein the valve is located within the interior compartment.

20. The method of claim 17, wherein the controller is located within the interior compartment.

* * * * *